United States Patent
Mazzarella

(10) Patent No.: US 9,871,767 B2
(45) Date of Patent: Jan. 16, 2018

(54) ENABLING AD HOC TRUSTED CONNECTIONS AMONG ENCLAVED COMMUNICATION COMMUNITIES

(71) Applicant: Mutualink, Inc., Wallingford, CT (US)

(72) Inventor: Joseph R. Mazzarella, Tolland, CT (US)

(73) Assignee: Mutualink, Inc., Wallingford, CT (US)

( * ) Notice: Subject to any disclaimer, the term of this patent is extended or adjusted under 35 U.S.C. 154(b) by 0 days.

(21) Appl. No.: 13/800,727

(22) Filed: Mar. 13, 2013

(65) Prior Publication Data

US 2013/0198517 A1 Aug. 1, 2013

Related U.S. Application Data

(63) Continuation-in-part of application No. 13/685,498, filed on Nov. 26, 2012, now Pat. No. 8,929,851, (Continued)

(51) Int. Cl.
*H04L 29/06* (2006.01)
*H04L 29/08* (2006.01)
(Continued)

(52) U.S. Cl.
CPC .......... *H04L 63/04* (2013.01); *H04L 63/0428* (2013.01); *H04L 63/0823* (2013.01);
(Continued)

(58) Field of Classification Search
CPC ........ H04L 67/104; H04L 67/16; H04L 41/12
See application file for complete search history.

(56) References Cited

U.S. PATENT DOCUMENTS 4,718,005 A * 1/1988 Feigenbaum et al. ........ 709/222
6,519,252 B2 2/2003 Sallberg
(Continued)

FOREIGN PATENT DOCUMENTS

EP          0 837 567 A2    4/1998
WO       WO 00/14902 A2    3/2000

OTHER PUBLICATIONS

Maughan, et. al., Internet Security Association and Key Management Protocol (ISAKMP), Nov. 1998, Network Working Group, Request for Comments: 2408 , 80 Pages.*
(Continued)

*Primary Examiner* — Lisa Lewis
*Assistant Examiner* — Christopher C Harris
(74) *Attorney, Agent, or Firm* — Sterne, Kessler, Goldstein & Fox P.L.L.C.

(57) ABSTRACT

The present invention is directed to systems and methods for establishing an electronic communications connection between secure communities. A secure community includes a collection of communication resources having an administrator that maintains control over the secure community. In an embodiment, a system for establishing an electronic communications connection between two or more secure communities includes a community gateway controller, an identification module, a secure community database configured to store secure community information, and an encryption compatibility module configured to determine a media transmission encryption scheme for a connection between a host secure community and a second secure community. Upon receipt of a request to establish the connection between secure communities, the community gateway controller determines whether to grant the request based on information stored in the secure community database and assigns a media transmission encryption scheme for the
(Continued)

connection based on the determination made by the encryption compatibility module.

37 Claims, 14 Drawing Sheets

Related U.S. Application Data which is a continuation-in-part of application No. 12/651,794, filed on Jan. 4, 2010, now Pat. No. 8,320,874, which is a continuation of application No. 11/488,409, filed on Jul. 18, 2006, now Pat. No. 7,643,445.

(60) Provisional application No. 60/595,578, filed on Jul. 18, 2005.

(51) Int. Cl.
  H04L 12/24 (2006.01)
  H04W 84/08 (2009.01)

(52) U.S. Cl.
  CPC .......... *H04L 41/12* (2013.01); *H04L 67/104* (2013.01); *H04L 67/16* (2013.01); *H04W 84/08* (2013.01)

(56) References Cited

U.S. PATENT DOCUMENTS

| | | | |
|---|---|---|---|
| 6,859,448 B1 | 2/2005 | Roy | |
| 6,889,321 B1 | 5/2005 | Kung et al. | |
| 6,968,187 B1 | 11/2005 | Irwin et al. | |
| 7,035,773 B2 | 4/2006 | Keyes, IV et al. | |
| 7,076,249 B2 | 7/2006 | Svedevall et al. | |
| 7,453,837 B2 | 11/2008 | Jiang et al. | |
| 7,483,416 B2 | 1/2009 | Olivier et al. | |
| 7,643,445 B2 | 1/2010 | Mills et al. | |
| 7,660,990 B1* | 2/2010 | Thomsen et al. | 713/171 |
| 7,739,728 B1* | 6/2010 | Koehler et al. | 726/11 |
| 7,747,778 B1* | 6/2010 | King et al. | 709/245 |
| 8,185,101 B1* | 5/2012 | Wiseman et al. | 455/422.1 |
| 8,320,874 B2 | 11/2012 | Mills et al. | |
| 8,364,153 B2 | 1/2013 | Boucher et al. | |
| 8,811,940 B2 | 8/2014 | Boucher et al. | |
| 8,929,851 B2 | 1/2015 | Mills et al. | |
| 9,014,957 B2 | 4/2015 | Bonawitz et al. | |
| 9,083,425 B1 | 7/2015 | Frolov et al. | |
| 2002/0102999 A1 | 8/2002 | Maggenti et al. | |
| 2002/0169954 A1* | 11/2002 | Bandini et al. | 713/153 |
| 2003/0105957 A1* | 6/2003 | Brabson et al. | 713/164 |
| 2003/0131232 A1* | 7/2003 | Fraser et al. | 713/156 |
| 2003/0220977 A1* | 11/2003 | Malik | 709/206 |
| 2004/0125802 A1 | 7/2004 | Lillie et al. | |
| 2004/0172550 A1* | 9/2004 | Sai | 713/193 |
| 2005/0079853 A1 | 4/2005 | Hurtta | |
| 2005/0170808 A1 | 8/2005 | Hamilton | |
| 2005/0203873 A1* | 9/2005 | McDonald | 707/1 |
| 2005/0250491 A1 | 11/2005 | Roy | |
| 2006/0020787 A1* | 1/2006 | Choyi et al. | 713/165 |
| 2006/0023654 A1 | 2/2006 | Koren et al. | |
| 2006/0046697 A1 | 3/2006 | Koren et al. | |
| 2006/0052113 A1 | 3/2006 | Ophir et al. | |
| 2006/0053290 A1* | 3/2006 | Randle et al. | 713/169 |
| 2006/0158329 A1 | 7/2006 | Burkley et al. | |
| 2006/0182131 A1 | 8/2006 | Dziekan, Jr. | |
| 2007/0010275 A1 | 1/2007 | Kiss | |
| 2007/0060144 A1 | 3/2007 | Mills et al. | |
| 2007/0103292 A1 | 5/2007 | Burkley et al. | |
| 2007/0184814 A1 | 8/2007 | Hamilton | |
| 2007/0198837 A1* | 8/2007 | Koodli et al. | 713/171 |
| 2008/0144525 A1 | 6/2008 | Crockett et al. | |
| 2008/0181145 A1 | 7/2008 | Chowdhury et al. | |
| 2009/0019170 A1* | 1/2009 | Wyss et al. | 709/229 |
| 2009/0036214 A1* | 2/2009 | Dahl | 463/42 |
| 2009/0207852 A1 | 8/2009 | Greene et al. | |
| 2010/0095127 A1* | 4/2010 | Banerjee et al. | 713/179 |
| 2010/0146582 A1* | 6/2010 | Jaber et al. | 726/1 |
| 2010/0159976 A1 | 6/2010 | Marocchi et al. | |
| 2010/0261427 A1 | 10/2010 | Mills et al. | |
| 2010/0263025 A1* | 10/2010 | Neitzel et al. | 726/4 |
| 2011/0144828 A1 | 6/2011 | Chengalva | |
| 2011/0299685 A1* | 12/2011 | Hall | 380/273 |
| 2012/0040635 A1* | 2/2012 | Boucher et al. | 455/404.2 |
| 2012/0233334 A1* | 9/2012 | Braudes et al. | 709/227 |
| 2012/0265867 A1 | 10/2012 | Boucher et al. | |
| 2013/0177321 A1 | 7/2013 | Devaul et al. | |
| 2014/0018976 A1 | 1/2014 | Goossen | |
| 2014/0236388 A1 | 8/2014 | Wong et al. | |
| 2014/0249693 A1 | 9/2014 | Stark et al. | |
| 2014/0316616 A1 | 10/2014 | Kugelmass | |
| 2015/0063202 A1 | 3/2015 | Mazzarella | |
| 2015/0268337 A1 | 9/2015 | Moe et al. | |

OTHER PUBLICATIONS

International Preliminary Report on Patentability and Written Opinion of the International Searching Authority directed to related International Patent Application No. PCT/US2012/026062, dated Sep. 6, 2013; 8 pages.

Non-Final Rejection dated Dec. 27, 2013 for U.S. Appl. No. 13/685,498, filed Nov. 26, 2012; 11 pages.

Final Rejection dated Jun. 23, 2014 for U.S. Appl. No. 13/685,498, filed Nov. 26, 2012; 6 pages.

Notice of Allowance dated Sep. 3, 2014 for U.S. Appl. No. 13/685,498, filed Nov. 26, 2012; 7 pages.

Notice of Allowance dated Mar. 27, 2014 for U.S. Appl. No. 13/402,505, filed Feb. 22, 2012; 7 pages.

Supplemental Notice of Allowability dated Jul. 16, 2014 for U.S. Appl. No. 13/402,505, filed Feb. 22, 2012; 2 pages.

U.S. Appl. No. 14/523,576, Mazzarella et al., "System and Method for Dynamic Wireless Aerial Mesh Network," filed Oct. 24, 2014.

International Search Report and Written Opinion of the International Searching Authority directed to related International Patent Application No. PCT/US2014/026672, dated Dec. 22, 2014; 19 pages.

Zao, J., et al., "Domain Based Internet Security Policy Management," Proceedings of DARPA Information Survivability Conference and Exposition (DISCE X '00), vol. 1, Jan. 2000; pp. 41-53.

International Search Report and the Written Opinion of the International Searching Authority directed to related International Patent Application No. PCT/US2012/026062, dated May 24, 2012, from the European Patent Office; 9 pages.

Non-Final Rejection dated Jun. 2, 2009 for U.S. Appl. No. 11/488,409, filed Jul. 18, 2006; 11 pages.

Notice of Allowance dated Nov. 9, 2009 for U.S. Appl. No. 11/488,409, filed Jul. 18, 2006; 6 pages.

Non-Final Rejection dated Sep. 17, 2010 for U.S. Appl. No. 12/651,794, filed Jan. 4, 2010; 8 pages.

Final Rejection dated Jan. 31, 2011 for U.S. Appl. No. 12/651,794, filed Jan. 4, 2010; 9 pages.

Non-Final Rejection dated Mar. 8, 2012 for U.S. Appl. No. 12/651,794, filed Jan. 4, 2010; 5 pages.

Notice of Allowance dated Aug. 1, 2012 for U.S. Appl. No. 12/651,794, filed Jan. 4, 2010; 7 pages.

Non-Final Rejection dated Mar. 22, 2012 for U.S. Appl. No. 12/856,383, filed Aug. 13, 2010; 6 pages.

Notice of Allowance dated Oct. 1, 2012 for U.S. Appl. No. 12/856,383, filed Aug. 13, 2010; 9 pages.

Non-Final Rejection dated May 24, 2013 for U.S. Appl. No. 13/402,505, filed Feb. 22, 2012; 9 pages.

Final Rejection dated Aug. 1, 2013 for U.S. Appl. No. 13/402,505, filed Feb. 22, 2012; 9 pages.

Co-pending U.S. Appl. No. 13/685,498, inventors Mills, D., et al., filed Nov. 26, 2012 (Not Published).

Non-Final Rejection dated May 5, 2016 for U.S. Appl. No. 14/523,576, filed Oct. 24, 2014.

(56) References Cited

OTHER PUBLICATIONS

Mehta et al., TDMA-Based Dual-Mode Communication for Mobile Wireless Sensor Networks, Sensors, Nov. 2012, ISSN 1424-8220; www.mdpi.com/journal/sensors, pp. 16194-16210.

Frew et al., Networking Issues for Small Unmanned Aircraft Systems, Springer Science+ Business Media B.V., Jul. 2008; Journal Intelligent Robot Systems (2009) 54:21-37.

De Freitas et al., Cooperation among Wirelessly Connected Static and Mobile Sensor Nodes for Surveillance Applications, Sensors, Sep. 2013, ISSN 1424-8220, www.mdpi.com/journal/sensors, pp. 12903-12928.

Andre et al., Application-Driven Design of Aerial Communication Networks, IEEE Communications Magazine, May 2014, pp. 129-137.

Sayyed et al., Dual-Stack Single-Radio Communication Architecture for UAV Acting as a Mobile Node to Collect Data in WSNs, Sensors, Sep. 2015, ISSN 1424-8220, www.mdpi.com/journal/sensors, pp. 23376-23401.

International Search Report and the Written Opinion of the International Searching Authority directed to related International Patent Application No. PCT/US2015/056147, dated Oct. 19, 2015 from the European Patent Office; 19 pages.

\* cited by examiner

ENABLING AD HOC TRUSTED CONNECTIONS AMONG ENCLAVED COMMUNICATION COMMUNITIES

CROSS-REFERENCE TO RELATED APPLICATIONS

This application is a continuation-in-part of U.S. patent application Ser. No. 13/685,498, filed on Nov. 26, 2012, entitled System and Method for Establishing an Incident Communications Network ("'498 application"), which is incorporated herein by reference in its entirety.

The '498 application in turn is a continuation-in-part of U.S. patent application Ser. No. 12/651,794, filed on Jan. 4, 2010, entitled System and Method for Establishing an Incident Communications Network ("'794 application"), which issued as U.S. Pat. No. 8,320,874 on Nov. 27, 2012, and is incorporated herein by reference in its entirety.

The '794 application in turn is a continuation of U.S. patent application Ser. No. 11/488,409, filed on Jul. 18, 2006, entitled Interoperable Communications System and Method of Use, which is issued as U.S. Pat. No. 7,643,445 on Jan. 5, 2010 ("'409 application"), and is incorporated herein by reference in its entirety.

The '409 application in turn claims priority to U.S. Provisional Patent Application No. 60/595,578, filed on Jul. 18, 2005, entitled Selective Interoperability in a Communications Network, which is incorporated herein by reference in its entirety.

BACKGROUND OF THE INVENTION

Field of the Invention

The present invention generally relates to electronic communications between secure communities, and more particularly, to providing dynamic access among secure communities, such as incident communications networks, that enables communication resources of a first secure community to securely access and/or utilize communication resources within other secure communities.

Background of the Invention

Recently, the dynamic creation and use of secure communities that include a collection of communications resources having an administrator that maintains control over a secure community have proliferated. The dynamic creation of secure communities either in response to an incident, event, or other pre-planned situation addressed the need to facilitate communications among disparate communication devices and resources.

Specifically, a plethora of disparate communications resources exist including resources using private wireless communications (e.g., public safety and first responder communications networks), public switched network communications resources, public wireless networks, networks of video surveillance devices, private security networks, and the like. Additionally, millions of consumers and public officials are now equipped with smartphone devices that include multiple communications abilities including both voice and video communications.

Often these communications resources cannot communicate to one another. For example, private wireless communication networks, such as those used by public safety or commercial users, are typically isolated from one another and often utilize different and incompatible technologies. While interoperability products are available to interconnect such diverse systems, cooperation among the entities involved is often a barrier to full implementation. Thus, prior art first responder communication systems exist wherein control of the resources of each organization coupled to the system is controlled by a central commander or controller. Each organization providing resources to the system must relinquish control of its resources to the central commander. The organization responsible for the operation of its radio system(s) may be unable or unwilling to grant control of its resources either to peer organizations or to a higher-level organization.

U.S. Pat. No. 7,643,445, entitled Interoperable Communications System and Method of Use, issued on Jan. 5, 2010, and U.S. Pat. No. 8,320,874, entitled System and Method for Establishing an Incident Communications Network, issued on Nov. 27, 2012, both of which are incorporated by reference in their entirety, describe systems and methods for providing an interoperable communications system ("interop system," also referred to as an Incident Communications Network) including a plurality of otherwise disjoint communications systems that addressed the deficiencies of prior art systems. The '445 and '874 patents specifically describe methods for establishing an incident communications network that enables interoperable communications among communications resources controlled by multiple organizations during an incident involving emergency or pre-planned multi-organization communications wherein a communications resource is controlled by an administrator within an organization.

Additionally, U.S. Patent Publication 2012/0265867, entitled Dynamic Asset Marshalling Within an Incident Communications Network, filed on Feb. 22, 2012, ("Marshalling Application") which is also incorporated herein by reference, extends the concepts of the '445 and '874 patents. Namely, the Marshalling Application provides systems and methods that marshal resources into an incident communications network based on a variety of factors, such as the type of incident and the type of resource being marshaled.

The creation of secure communities, however, results in the inability of communication resources in one secure community to communicate with communication resources in another secure community. The problem is exacerbated by the fact that most secure communities have a very strong desire to maintain their trusted domain and high level of security. Allowing internetworked communications to occur with less trusted community domains represents a risk, especially if internetworked based access is persistently "open." Notwithstanding the desire to maintain secure, enclaved communities, there is a recognition among the highly sensitive communities that their missions and operational needs may at times require communications with other entities outside of their communities.

It is the general object of the present invention to address this need, and provide systems and methods that establish electronic communications connections between two or more secure communities, while maintaining the high security levels required by secure communities.

BRIEF SUMMARY OF THE INVENTION

The present invention provides systems and methods for establishing an electronic communications connection between two or more secure communities. A secure community includes a collection of communication resources having an administrator that maintains control over the secure community. Example secure communities include incident communication networks.

An incident communications network enables interoperable communications among communications resources controlled by multiple organizations or individuals during an incident involving emergency or pre-planned multi-organization communications in which a communications resource is controlled by an administrator within an organization or an individual.

In an embodiment, a system for establishing an electronic communications connection between two or more secure communities includes a community gateway controller, an identification module coupled to the community gateway controller, a secure community database coupled to the community gateway controller configured to store secure community information, and an encryption compatibility module coupled to the gateway controller configured to determine a media transmission encryption scheme for a connection with a host secure community and a second secure community.

Upon receipt of a request to establish a connection between the host and second secure communities, a community gateway controller determines whether to grant the request based on information stored in the secure community database and assigns a media transmission encryption scheme for the connection based on the determination made by the encryption compatibility module. In effect, the connection of two secure communities is based on a dual-gated system. That is, a community gateway controller will exist in the first secure community that attempts to establish a connection with a second secure community. The second secure community will also be "gated" by a community gateway controller that will determine whether to permit the connection.

In further embodiments, the system includes a secure community membership directory module coupled with the gateway controller that is configured to determine what member information within the host secure community is made available to other secure communities. Additionally, the system may include a graphical user interface that displays secure community information and other community status information.

Methods for establishing an electronic communications connection between two or more secure communities are also provided.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
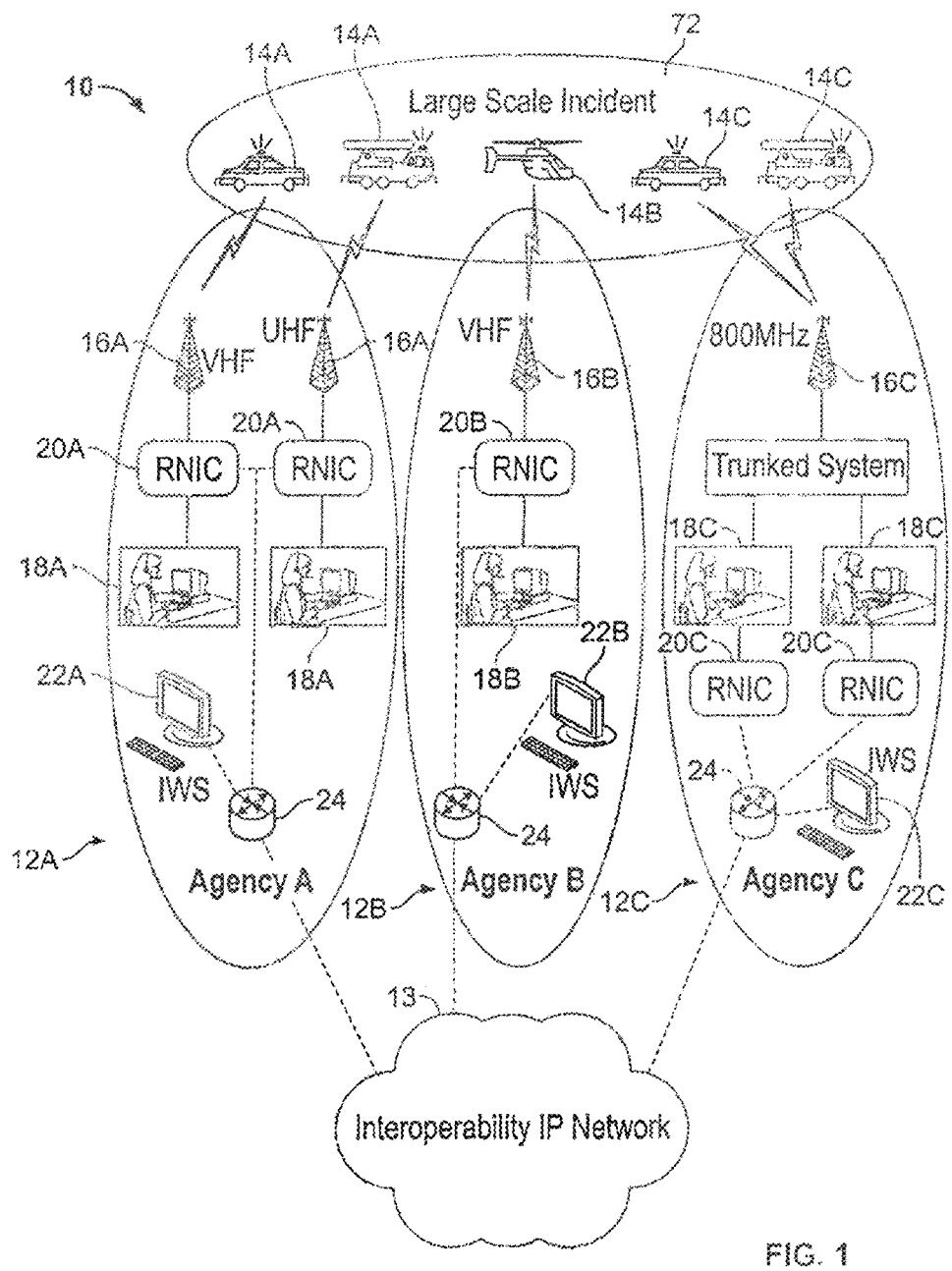
FIG. 1 is a block diagram showing an overview of one embodiment of an interoperable communications network in accordance the present invention.

As shown in FIG. 1, the present invention is directed to an interoperable communications system, hereinafter referred to as "Interop System" or an "Incident Communications Network" generally referred to by the reference numeral 10, which provides for communication between a plurality of separate radio networks 12, and/or other types of networks, such as telecommunication networks, video networks and data networks, which are not shown. In the FIG. 1 embodiment, the Interop System 10 includes the separate radio networks 12A, 12B and 12C each coupled to a common network 13 referred to as an Interoperability IP Network or hereinafter as the "Interop Network". Each radio network 12A-12C includes corresponding communication devices 14A-14C respectively, which includes mobile communication devices 14A-14C mounted in various vehicles. Although not shown, hand-held or other types of portable communications devices 14 are also often utilized in the radio networks 12. As described following, users of the communication devices 14A-14C of each radio network 12A-12C respectively can communicate to all other users of each of the radio networks 12A-12C via the Interop Network 13 in accordance with the present invention.

Each of the radio networks 12A-12C also includes typical antennas 16A-16C and base consoles 18A-18C. The radio networks 12A-12C represent typical radio networks utilizing one of various communications channels including Very High Frequency (VHF), and Ultra High Frequency (UHF), among others, which are coupled together forming the Interop System 10 in accordance with the present invention. For example, FIG. 1 includes diagrams of various typical radio networks 12 including a two-channel system 12A, a single channel system 12B, and a trunked system 12C which are each coupled to the Interop Network 13 and together form the Interop System 10 in accordance with the present invention.

Still referring to FIG. 1, the Interop System 10 includes at least one radio network interface controller 20A-20C (herein referred to as "RNIC") coupled to each of the radio networks 12A-12C respectively. Each RNIC 20A-20C is coupled to the corresponding radio network 12 as well as the common Interop Network 13 and a controller 22 identified herein as an Interoperability Work Station (IWS). Each RNIC 20 is operable in response to commands from one or more IWS controllers 22 designated as having control over the particular RNIC 20 for coupling an associated radio network 12 to the Interop Network 13 for the purpose of transmitting and receiving messages to/from each of the other radio networks coupled to the Interop Network. The two-channel radio network 12A includes two interfaces RNIC 20A one for coupling each channel of the two-channel radio network to the Interop Network 13. Still referring to the radio network 12A, each of the two RNIC 20A interfaces are coupled to and controlled by a single IWS controller 22. However, in other embodiments of the present invention, other configurations may be utilized including wherein a single RNIC 20 is configured to connect both channels of a two-channel network to the Interop Network 13 or wherein each RNIC 20A is coupled to controllable by individual IWS controllers 22.

Still referring to FIG. 1, the Interop System 10 includes a router 24 coupled between the Interop Network 13 and the RNICS 20 and IWS controllers 22 for each radio network 12 for routing messages transmitted within the Interop Network 13. Alternatively, in other embodiments of the Interop System 10, other types of data switches or hubs may also be utilized instead of the data router 24.

In a preferred embodiment, the Interop System 10 transmits messages between the multiple radio networks 12 via IP protocol over the Interop Network 13, however, the scope of the present invention is not limited in this regard as any suitable transmission protocols and corresponding network could be utilized.

Figure 2:
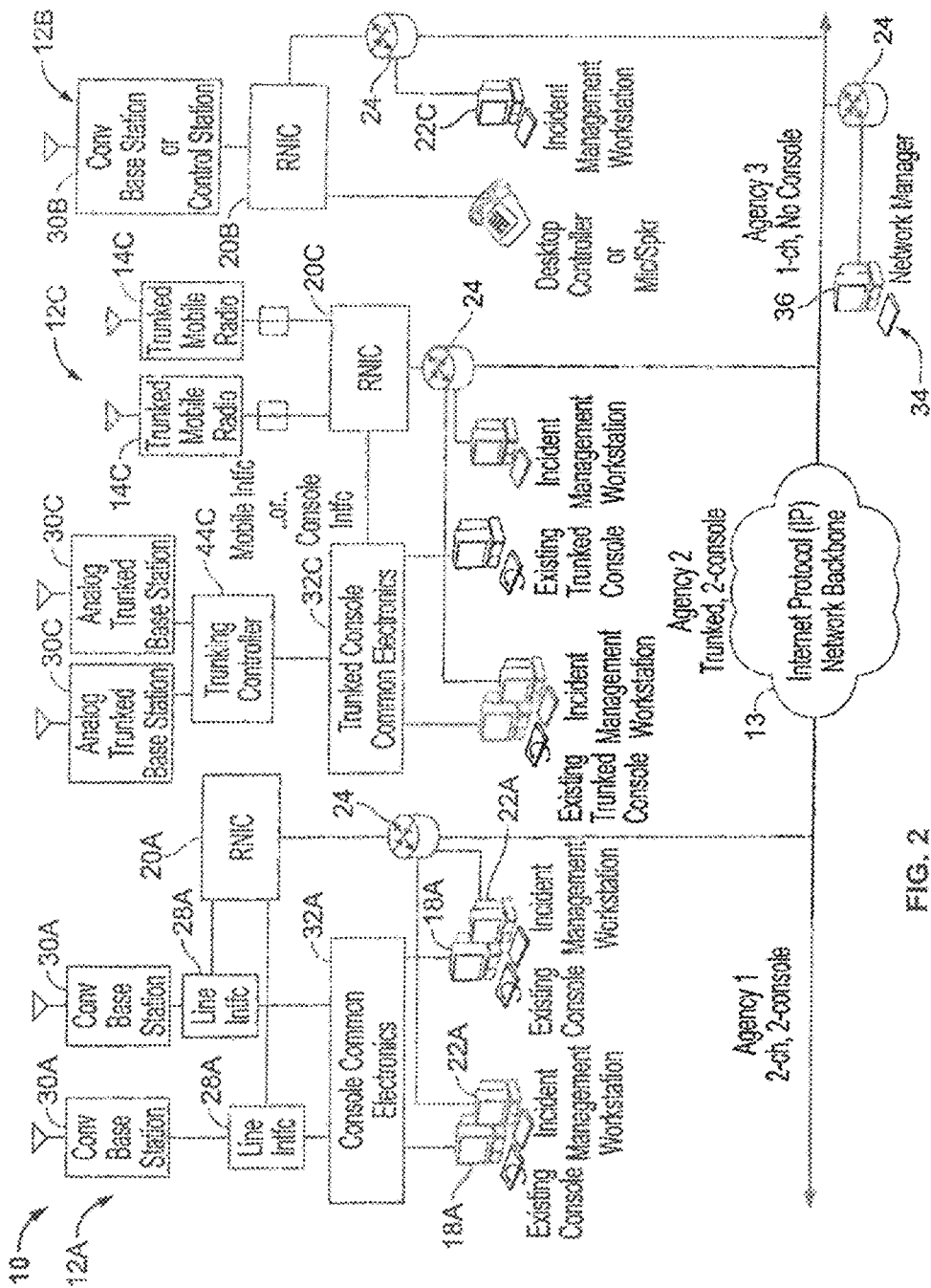
FIG. 2 is a block diagram showing another embodiment of an interoperable communications network in accordance with the present invention.

Preferably, the present invention Interop System 10 is configured as overlay architecture connectable to pre-existing radio networks 12A-12C as shown in FIG. 2. Typically, an RNIC 20 and IWS controller 22 is coupled to each existing radio network 12A-12C for connecting each radio network to the common Interop Network 13. In this embodiment, the existing radio networks 12A-12C are usually left in place for normal operation apart from the Interop System 10. Depending on the radio network 12 being coupled to the Interop Network 13, various types of line interfaces 28 are utilized for coupling the RNIC 20 to the particular radio network.

As shown in FIG. 2, the radio network 12A includes conventional base stations 30 or repeaters connected to base consoles 18A via conventional console electronics 32A. A line interface 28A is provided for coupling the RNIC 20A to the radio network 12A. Depending on the configuration of the radio network 12, the line interface 28 may include various known interfaces such as, local control interfaces (audio, push-to-talk (PTT), receiving indication), DC remote, tone remote, and ear and mouth (E & M) interfaces.

Alternatively, the RNIC 20C is connected to a trunked radio network 12C via an air interface 40C coupled to mobile radios 42C. In another embodiment, also illustrated in FIG. 2, the RNIC 20C can be coupled to the radio network 12C via typical console electronics 32C and trunking controller 44C.

Still referring to FIG. 2, the radio network 12B is coupled to the Interop Network 13 via the RNIC 20B coupled in-line in the existing radio network. Thus, the communications devices 14B are provided selective access to the Interop Network 13 via the RNIC 20B pursuant to commands from the IWS controller 22B associated with the radio network 12B or another authorized IWS controller 22.

Referring again to FIG. 2, a network administrator or manager 34 including a network server 36 may be coupled to the Interop Network 13 for carrying out administrative duties related to the Interop Network. Alternatively, in other embodiments of the Interop System 10, configuration of the network can be implemented from endpoints such as the IWS controllers 22 and RNIC 20 servers wherein a network administrative server is not required.

Figure 3:
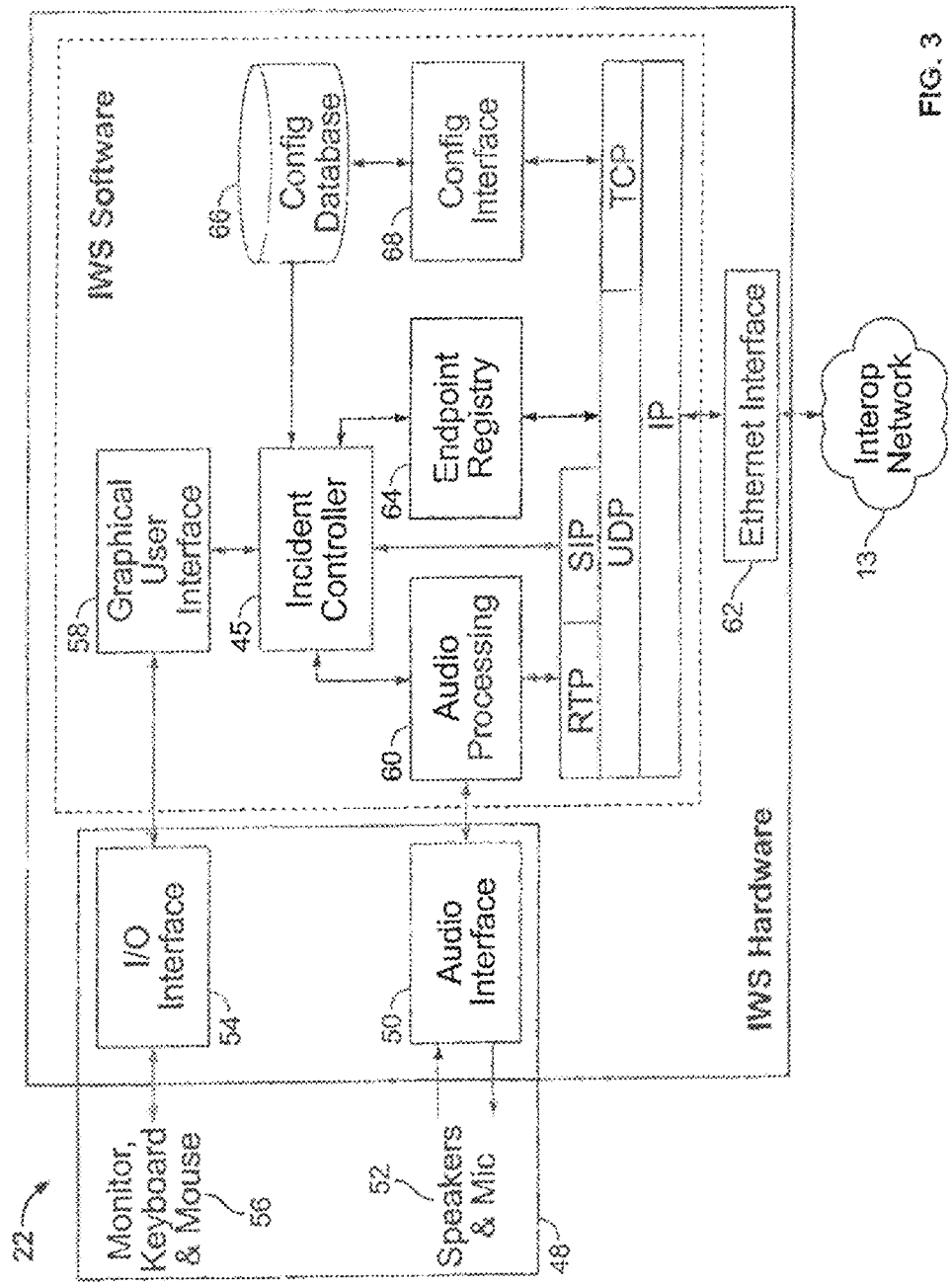
FIG. 3 is a block diagram of one embodiment of an Interoperability Workstation (IWS) controller in accordance with the present invention.

Referring now to FIGS. 1 and 3, each IWS controller 22 is coupled to the Interop Network 13 and the RNIC 20 for controlling the connection between the associated radio network 12 and the Interop Network 13. Thus, the connection between each radio network 12 and the Interop Network 13 is controlled by the IWS controller 22 associated with each radio network via the RNIC 20. This is a key feature of the present invention as control over each radio network 12 and the communication devices 14 associated therewith is maintained by an IWS controller 22 coupled thereto. As set shown in FIG. 3, the IWS controller 22 includes a computer processor identified as incident controller 45 having a user interface 48 including one or more of an audio interface 50 including a speaker and microphone 52 and an I/O interface 54 including a keyboard, mouse, monitor, joystick, etc., collectively, identified by the reference numeral 56. A graphical user interface (GUI) 58 is provided coupled to the I/O interface 54 for providing graphics based outputs to a user of the IWS controller 22 such as the GUI included in FIG. 6.

The IWS controller 22 includes an audio processor 60 coupled to the incident controller 45 and the audio interface 50 for processing audio inputs/outputs transmitted to and from the IWS controller respectively. The audio processor 60 converts data packets received by the IWS controller 22 to audio signals and outputs the same to a user of the IWS controller via the audio interface 50. Similarly, audio signals input to the IWS controller are converted by the audio processor 60 and/or the incident controller 45 and transmitted to the appropriate recipient via a network interface 62 and the Interop Network 13. In the preferred embodiment, audio signals are transmitted over the Interop Network 13 using standard RTP or SRTP as appropriate for real time transmission of audio messages, however other protocols may be utilized.

The IWS controller 22 includes an endpoint registry 64 coupled to the incident controller 45 and the network interface 62 for storing address information for all endpoints in the Interop System 10 including all RNIC 20 servers and all IWS controllers 22. Each endpoint in the Interop Network 13 periodically announces its presence to all other endpoints in the Interop Network (the preferred embodiment uses IP multicast to perform this announcement). All other endpoints that receive this announcement add the originating endpoint to their endpoint registry 64. The endpoint registry 64 allows each endpoint to communicate directly with any other endpoint in the Interop Network 13 without the need for an intervening server.

The IWS controller 22 also includes a configuration database 66 and configuration interface 68 coupled to the incident server and the Interop Network 13. The configuration database 66 is provided for storing configuration data for the IWS controller 22 as well as other IWS controllers 22 and RNIC 20 servers including public key information for each RNIC 20 and IWS controller 22 in the Interop System 10. A preferred embodiment of the interop System 10 utilizes a public key cryptography method for encrypting messages transferred over the Interop Network 13.

Each RNIC 20 is configured with a list of IWS controllers 22 that have permission to control the operation of that RNIC which are stored in the configuration database 66 coupled to the RNIC. For security purposes, each RNIC 20 verifies that a received message is from one a trusted IWS controller 22.

For message authentication, the preferred embodiment of the Interop System 10 uses public-key cryptography as follows: Each endpoint in the system (RNIC 20 or IWS controller 22) is assigned a private key and a public key in accordance with standard key generation techniques. The private key is stored only on the endpoint associated therewith. The public key is distributed to all other endpoints in the network via the configuration interface 68. Messages from an endpoint to other endpoints are encrypted using the originating endpoint's private key. Messages received by an endpoint are decoded using the originating endpoint's public key. If this decode process is successful, the message originator and contents are securely authenticated.

The Interop System 10 provides for multiple authorized IWS controllers 22 to control a particular RNIC 20 and thereby control connection between the associated communications devices 14 and the Interop Network 13. Typically, for use during incidences involving multiple municipalities or jurisdictions, or other events, resources including radio networks 12 and the associated communication devices 14 may be shared by multiple organizations including wherein several or all of the organizations may be permitted to exercise control over the shared resources. The Interop System 10 provides for multiple organizations to control shared radio networks 12 by designating each of the IWS controller 22 for each of the multiple organizations as authorized to control the RNIC 20 associated with the shared network. Thus, the RNIC 20 is configured to include all authorized IWS controllers 22 as authorized to provide instructions to the RNIC. Although the commands are sent to the RNIC 20 as session invitations, the RNIC is configured to accept all invitations from authorized IWS controllers 22.

Figure 4:
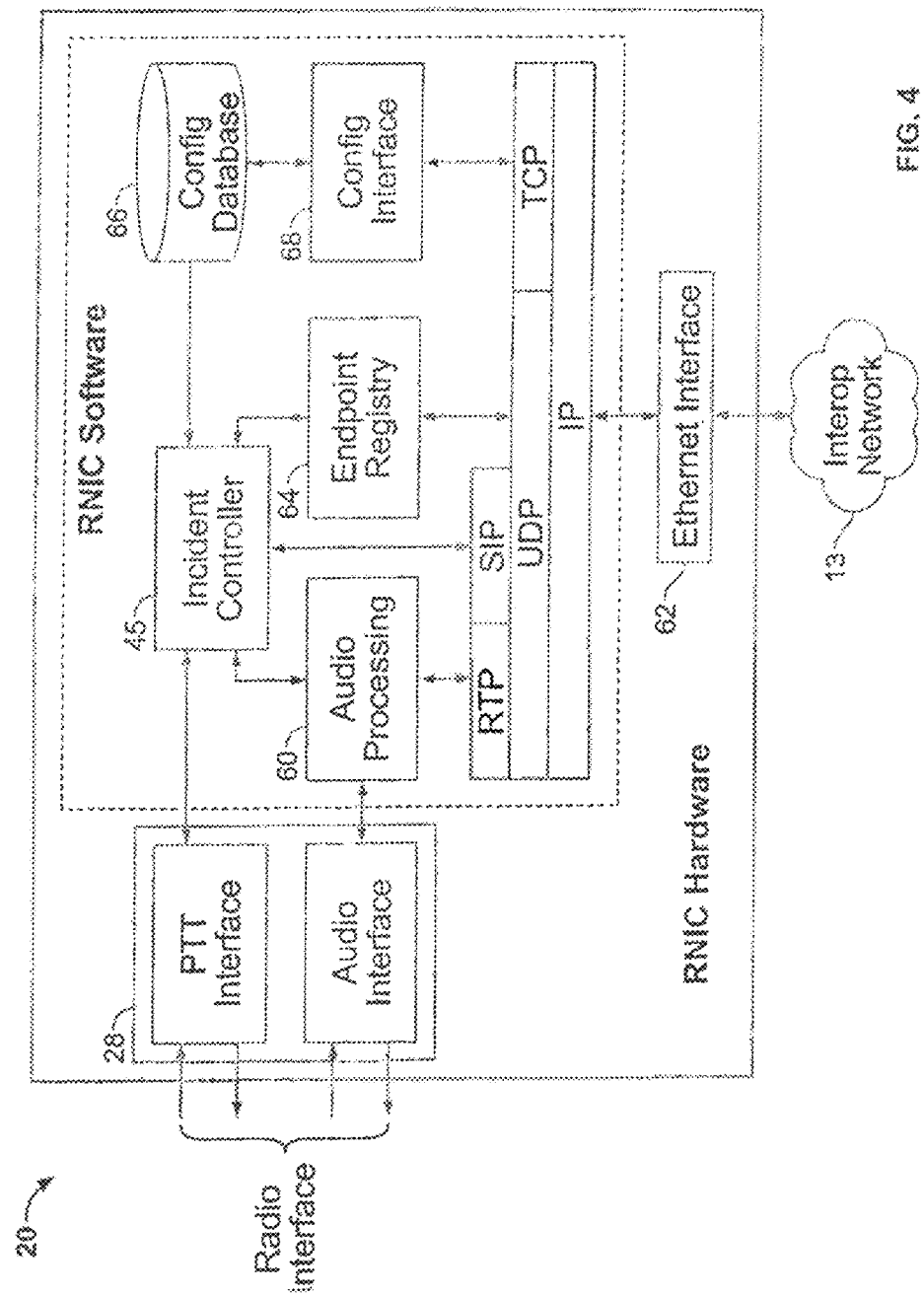
FIG. 4 is a block diagram of one embodiment of a Radio Network Interface Controller (RNIC) in accordance with the present invention.

Referring to FIG. 4, the RNIC 20 coupled to each radio network 12 includes an incident controller 45, coupled to an audio processor 60, an endpoint registry 64, a configuration database 66 and a configuration interface 68 as set forth above with respect to the IWS controller 22. The incident controller 45 is coupled to an associated radio network 12 via a radio interface 28 and the Interop Network 13 via a network interface 62.

Figure 5:
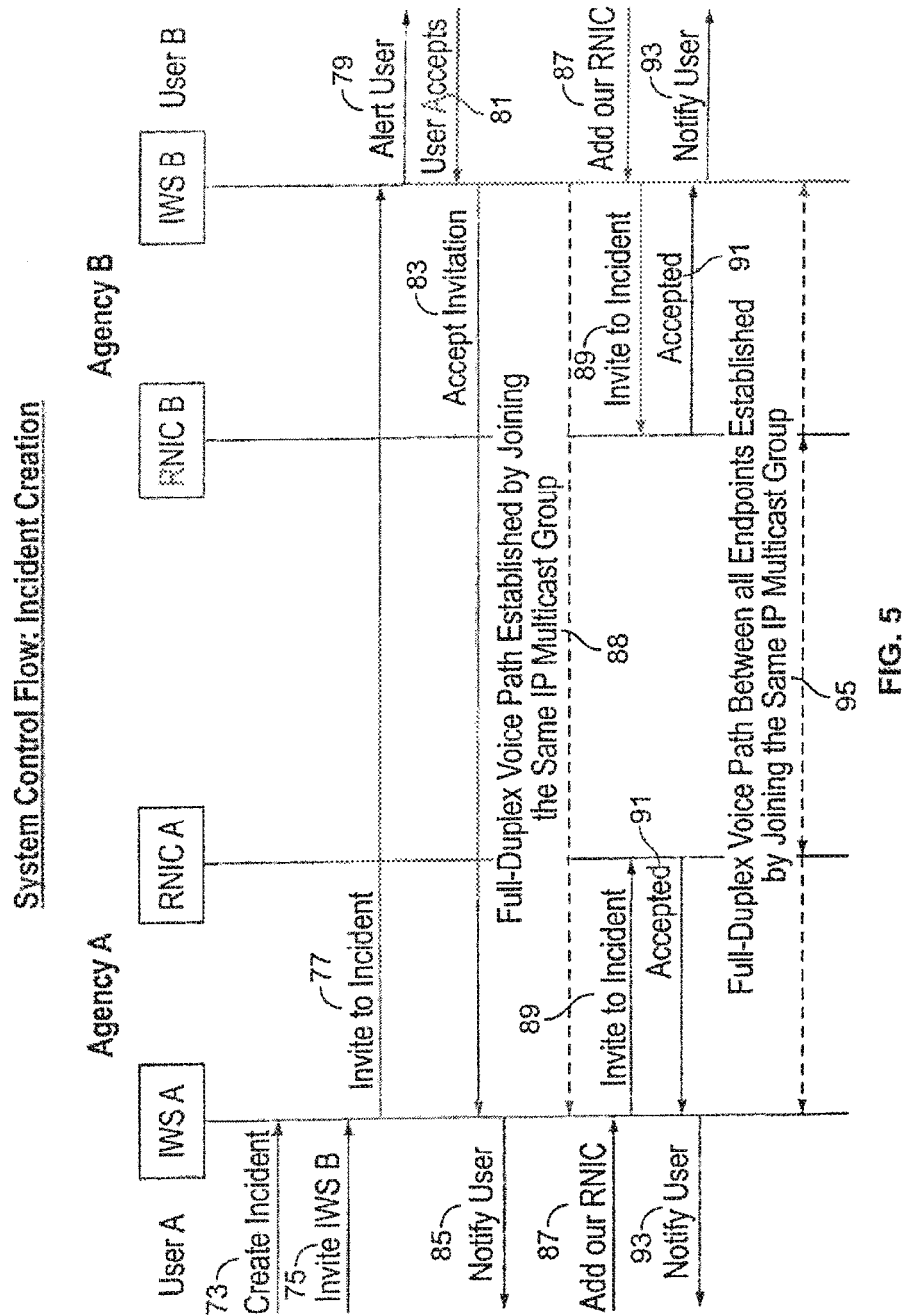
FIG. 5 is an event flow diagram showing the creation of an incident in accordance with the present invention interoperable communications network.
Figure 6:
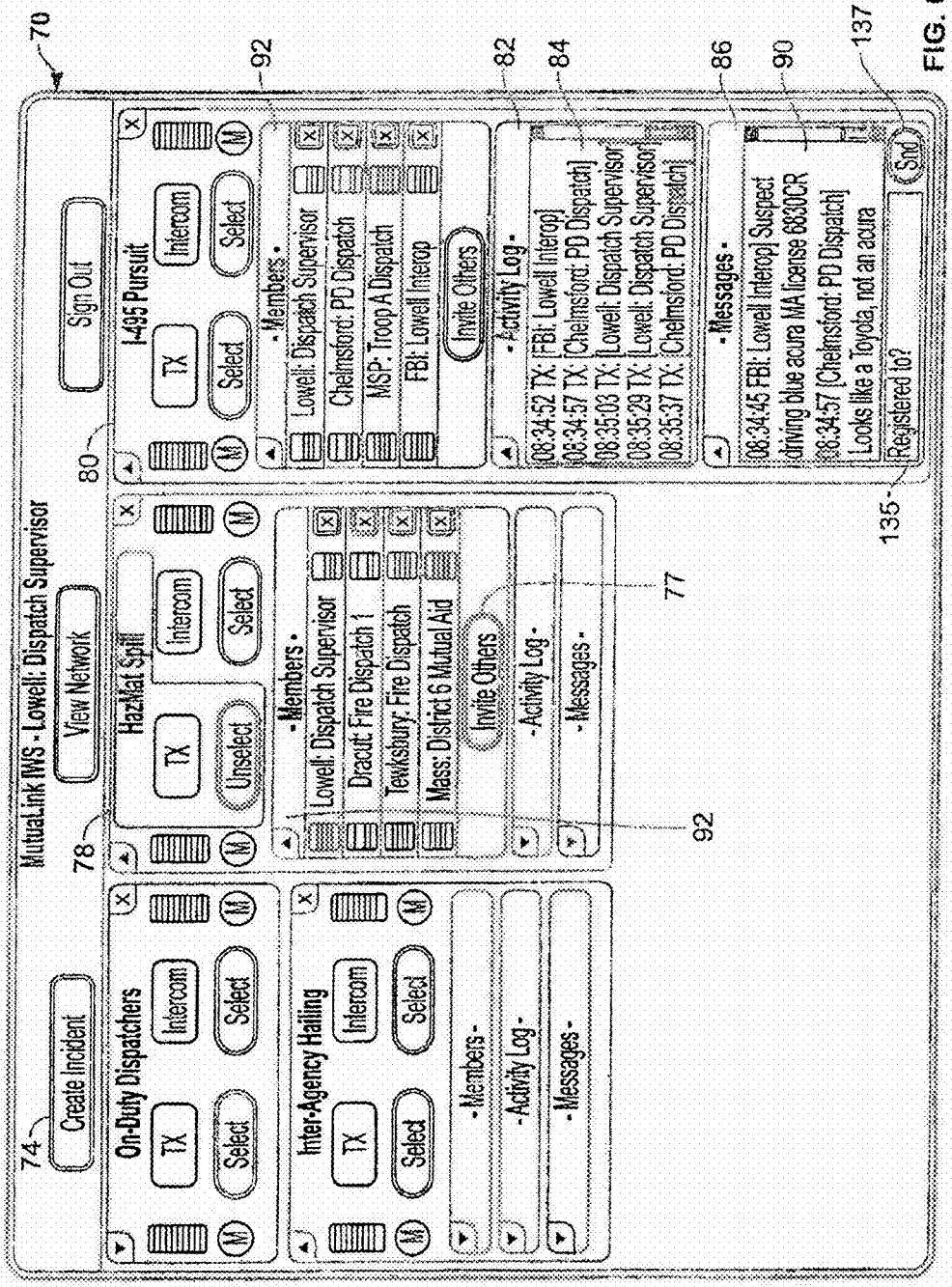
FIG. 6 is a diagram showing one embodiment of a graphical user interface (GUI) for use with an IWS of the present invention.
Figure 7:
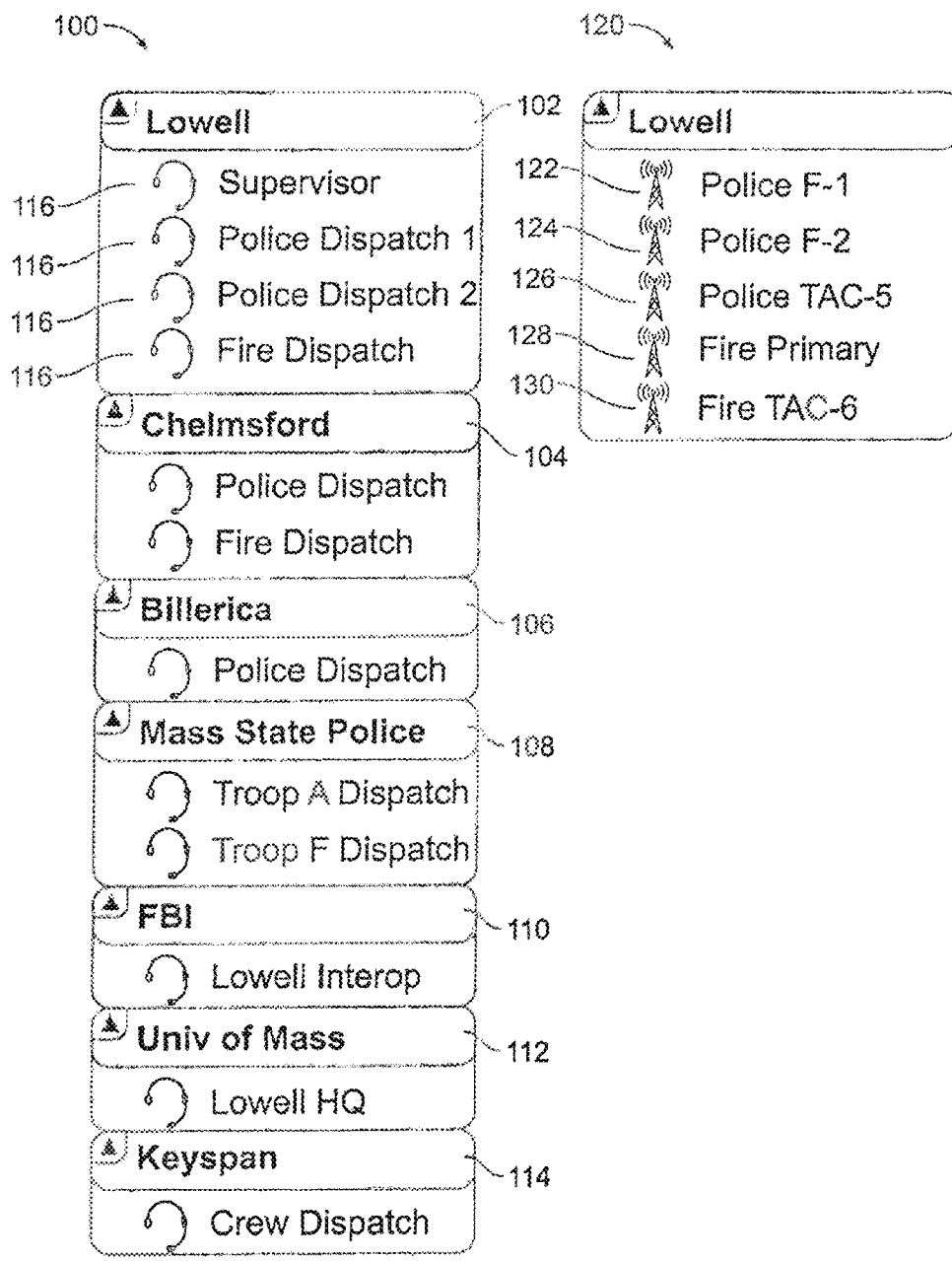
FIG. 7 is a diagram showing one embodiment of a GUI in accordance with the present invention for use with an IWS controller for contacting various other IWS controllers and networks within the system.

In operation, the IWS controller 22 creates an incident as set forth in the event flow diagram 70 of FIG. 5 and described following. An operator, User A, via an IWS controller 22 (IWS A) initiates a new incident 72 (FIG. 5, step 73) using the create incident button 74 of the GUI 76. (GUI 76 is illustrated in FIG. 6). The incident controller 45 assigns an IP address that will be used for voice communications for the incident 72 (the preferred embodiment uses an IP multicast address). If User A desires to talk to another IWS controller 22 (IWS B), he uses the GUI 76 via invitation button 77 associated with the incident 72 to select a particular IWS controller 22 to invite to participate in the incident 72 (FIG. 5, step 75). A GUI 100 (FIG. 7) is utilized by an IWS controller 22 for selection of another IWS controller to invite to an incident 72 or peer-to-peer talk group. In the FIG. 7 embodiment, each agency having IWS controllers 22 available on the Interop System 10 is identified on the GUI 100 (i.e., Lowell—102; Chelmsford—104; Billerica—106; Massachusetts State Police—108; FBI—110; University of Massachusetts—112; Keyspan—114.) The user of an IWS controller can select one or more IWS controllers 22 using the icons 116 identifying each IWS controller available. In this example, selecting the IWS B causes the incident controller 45 to look up and retrieve the address of IWS B in the endpoint registry 64. The incident controller 45 then sends an invitation to the particular IWS controller 22 selected using the Interop Network 13 (FIG. 5, step 77).

The incident controller on IWS B receives the invitation and provides a notification to the User B as to the invitation (FIG. 5, step 79). The User B may then accept or decline the invitation. Per the FIG. 5 example, User B accepts the invitation at step 81. Upon User B acceptance of the invitation, the incident controller 45 (of IWS B) sends an acceptance message to IWS A (FIG. 5, step 83) and the user thereof (User A) is alerted of the acceptance of User B at step 85.

Thereafter, the incident controllers 45 of both IWS A and IWS B direct their respective audio processors 60 to start a bidirectional audio stream as follows: Audio input from the IWS microphone 52 is converted to data packets (the preferred embodiment uses standard RTP or SRTP as appropriate) and is transmitted to the IP address assigned to the incident. This transmission may optionally be enabled by pressing a PTT (Push-To-Talk) button and disabled by the release of this button. Data packets received on the assigned IP address are converted to audio and sent to the IWS speakers 52. Thus, User A and User B are now engaged in a full-duplex voice conversation via their respective IWS controllers 22 (FIG. 5, event 88).

A preferred embodiment of the Interop System 10 uses the standard SIP protocol with message encryption to transmit messages over the Interop Network 13. However, the routing of information/data over the Interop Network 13 can be via any suitable protocol thus, the scope of the Interop System is not limited with respect to a particular data transmission protocol.

Still Referring to FIG. 5, following acceptance of an invitation to allocate its radio network 12 and associated communications devices 14, each IWS controller 22 must issue appropriate commands to the RNIC 20 coupled to the designated radio network to connect the same to the Interop Network 13. Thus, each IWS user (FIG. 5, User A and User B) intends to allocate an RNIC 20 under their control (e.g. RNIC A and RNIC B respectively) to participate in the incident. The operator of each IWS controller 22 then uses a GUI such as the GUI 120, shown in FIG. 7, to select an RNIC 20 (and associated radio network 12) allocated for the incident and for which the IWS controller 22 is authorized to control (FIG. 5, step 87). For example, the GUI 120 for Lowell (Lowell, Mass.) identifies an RNIC 20 for each of a Police F1—122; Police F2—124; Police TAC-5—126; Fire Primary—128; and Fire TAC-6—130. As indicated in the FIG. 7 example, the Lowell GUI 120 indicates only RNICs 20 for which the IWS controller 22 is authorized to control. Thus, the RNICs associated with other agencies do not appear on the GUI 120 of the IWS controllers 22 associated with the Lowell agencies.

As set forth above, each incident 72 created includes a separate IP address designated for that incident. Thus, if multiple incidents occur simultaneously wherein the same organizations are invited to couple their resources to the Interop Network 13, the audio transmissions are communicated to the radio networks 12 via the separate IP addresses for each incident 72. Accordingly the endpoint group for one incident 72 may include some common resources such as the IWS controllers 22 as well as various different or common RNICs 20 and associated radio networks 12.

As further shown in FIG. 5, the incident controller 45 for each IWS controller 22 then looks up and retrieves the IP address of the RNIC 20 to be coupled to the Interop Network 13 in the endpoint registry 64. The IWS controller 22 and/or incident controller 45 (FIG. 5, IWS A and IWS B) then sends an invitation to the retrieved address of the RNIC 20 using the Interop Network 13. (FIG. 5, step 89). As set forth above, the preferred embodiment uses the standard SIP protocol with message encryption. The incident controller 45 on the designated RNIC 20 receives the invitation and verifies (via the public keys stored in the configuration database 66) that the invitation is from an IWS controller 22 that has permission to control that RNIC. If verified, the RNIC 20 accepts the invitation, which causes the incident controller to send an acceptance message to the inviting IWS controller. (FIG. 5, step 91). The user of the IWS controller is notified of the acceptance by the RNIC 20 at step 93.

To complete the coupling of the allocated radio network 12 to the Interop Network 13, the incident controller 45 on the RNIC 20 directs the audio processor 60 to start a bidirectional audio stream as follows: Audio input from the connected resource (i.e., radio network 12) is converted to data packets (the preferred embodiment uses standard RTP or SRTP as appropriate) and is transmitted to the IP address assigned to the incident 72. This transmission may optionally be gated by either an "audio present" control signal from the resource, or by the audio processor 60 detecting that a sufficient audio signal is present. Data packets received on the assigned IP address are converted to audio and sent to the connected resource i.e., radio network 12 and thereby the associated communication devices 14). While such audio is being sent, the RNIC 20 will output an "audio present" control signal for use by the radio network 12. Still referring to the FIG. 5 example, all four endpoints (IWS A, IWS B, RNIC A, RNIC B) are thereby engaged in a full-duplex voice conversation which is established by joining the same in an IP multicast group (FIG. 5, event 95). Thus, any audio sent by one of the endpoints is received by all of the other endpoints.

Referring again to FIG. 6, the GUI 70 displays an activity log 82 including displaying a chronological listing 84 of the communications of each communications device 14 coupled to the incident 72. Additionally, a message window 86 on GUI 70 displays text messages conveyed between IWS controllers 22 associated with an incident 72. The message window 86 implements a text-messaging (or instant messaging) capability between the IWS controllers 22 participating in an incident 72. Operators of the IWS controllers 22 enter a message in the bottom window 135 then click the send button 137; The message is then sent to all other IWS controllers 22 which are currently members of the incident 72 and appears in the message window 86 of each of these IWS controllers. As shown in FIG. 6, identification headings as to the source of the messages are appended to the displayed listing 84 and the transcriptions 90 to identify the source of the transmission. This is one example of how the Interop System 10 provides more than just voice interoperability between discrete systems.

Still referring to FIG. 6, the GUI 70 also includes a member listing 92 for each incident 72 that identifies each organization or radio network 12 which have authorized coupling its associated radio network to the Interop Network 13 for the particular incident. Thus, the IWS controller 22 has a visual display showing all organizations and associated radio networks 12 coupled to the Interop Network 13 for each incident.

At any time during or following the completion of an incident 72, an IWS controller 22 via a user thereof may terminate the coupling between an associated radio network 12 for which the IWS controller is authorized to control and the Interop Network 13.

Accordingly, each IWS controller 22 communicates with other IWS controllers and RNIC 20 servers as peer-to-peer nodes in the Interop Network 13. Additionally, each RNIC 20 operates in response to commands from an authorized IWS controller. Incident communications are transmitted to all IWS controllers 22 and RNIC 20 servers coupled to an incident 72 using peer-to-peer multicast transmissions. Accordingly, each RNIC 20 and associated radio network 12 is coupled to the Interop Network 13 pursuant to commands from an authorized IWS controller 22. Thus, control of each radio network 12 is maintained by an IWS controller 22 associated therewith.

Although, the above-identified embodiment of the invention illustrates a system and method for coupling a plurality of radio networks 12 to the Interop Network 13, the present invention is not limited in this regard as other types of communications systems and networks can also be coupled to an Interop Network 13 in accordance with the present invention. For example, a public address system (e.g., the public address system in a high school or college campus) can be coupled to the Interop Network 13 via an RNIC 20 server and appropriate interface such that agencies such as police or fire organizations can directly operate and communicate over the public address system via the Interop Network 13. Thus, any type of discrete communications system can be coupled to the Interop System in accordance with the present invention via an RNIC 20 and appropriate interface.

Further, it is not required that the RNIC 20 and IWS controller 22 reside on separate servers, thus the Interop system 10 disclosed can be integrated directly into dispatch consoles present in an existing system. Alternatively, the interop system disclosed can be integrated directly into a computer-aided dispatch (CAD) system.

Additionally, the Interop system of the present invention can be used to permit discrete organizations, and the computer networks associated therewith, to be accessible to otherwise disjunct agencies or networks. For example, the present invention Interop System 10 can be utilized to provide police unit field units access to data facilities residing on a database coupled to an otherwise disjunct network, such as a crime database or floor plan of a building. Thus, the disclosed system can be used to selectively grant access to data sources, such as a database.

Another example of resources which are connectable to an interop System of the present invention are video systems including video cameras, such as surveillance or in-vehicle cameras wherein access to the video data captured thereby is selectively provided to other users of the Interop system.

As set forth above, many other types of communications devices can be coupled to an Interop System in accordance with the present invention wherein selective access to certain resources is provided to other organizations and users thereof coupled to the system. Access is granted and controlled only by authorized controllers associated with the resources.

Further, a pre-planned ("storm plan") can be developed to facilitate rapid setup of an incident configuration in accordance with the present invention system. Also, the disclosed system can provide communications among a defined subset of members (such as certain IWS controllers only, permitting dispatchers to "conference" off-the-air with respect to an incident group).

Figure 8:
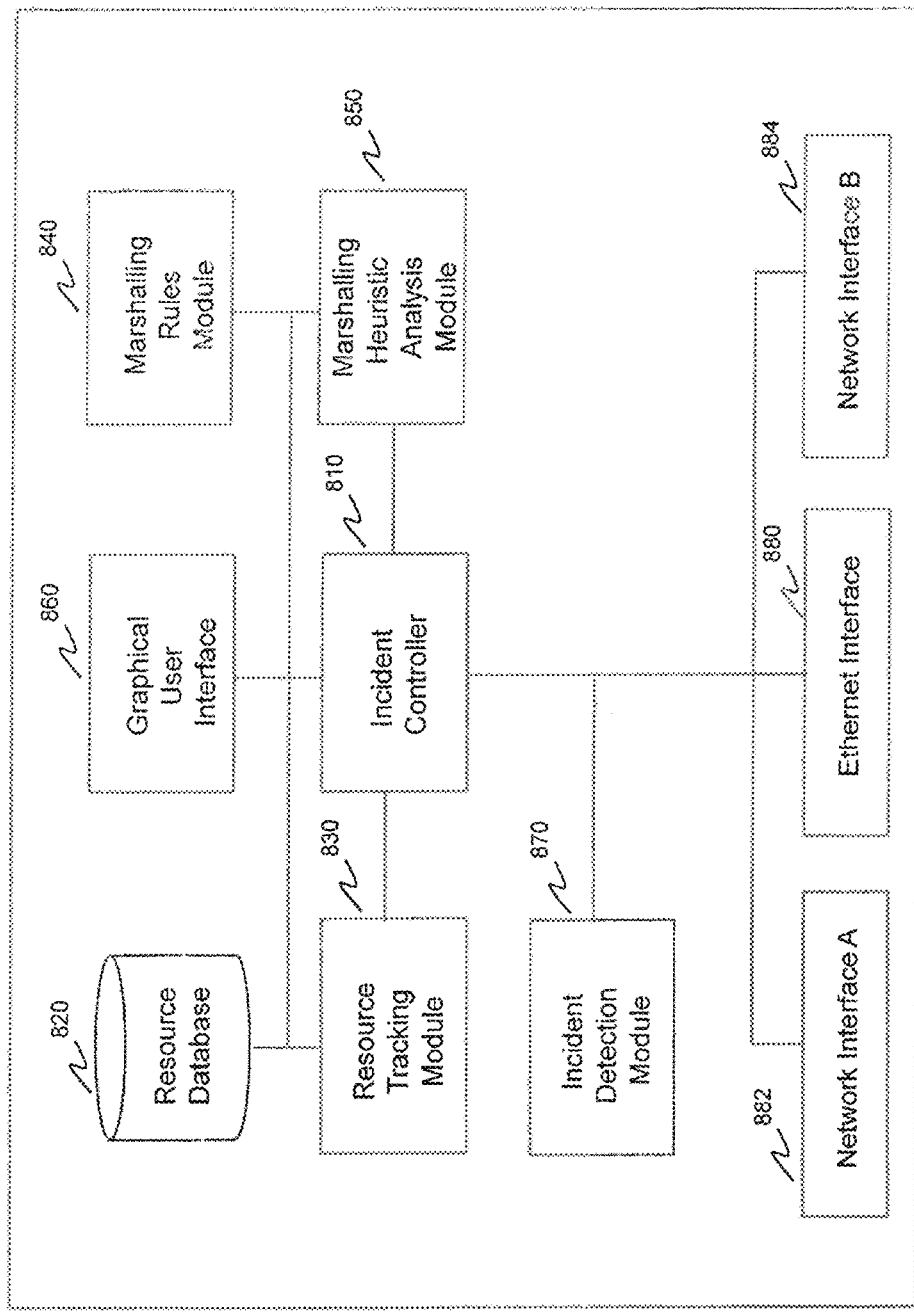
FIG. 8 is a block diagram of a system for establishing an incident communications network, according to an embodiment of the invention.

In a further embodiment, a system for establishing an incident communications network that enables interoperable communications among communications resources controlled by multiple parties during an incident involving emergency or pre-planned multi-party communications is provided that includes a marshalling rules module coupled to the incident controller that stores a set of rules, such that each rule identifies how to select the communications resources to be marshaled into an incident communications network based on an incident trigger. FIG. 8 provides a block diagram of an incident communications network system 800, according to an embodiment of the invention.

Incident communications network system 800 includes incident controller 810, resource database 820, resource tracking module 830, marshalling rules module 840, marshalling heuristic analysis module 850, graphical user interface 860 and incident detection module 870. Additionally, incident communications network system 800 includes a variety of network interfaces, including Ethernet interface 880, network interface A 882 and network interface B % 884. Network interface A 882 and network interface B 884 support either wireless or wireline network interfaces and a variety of networking protocols.

Incident controller 810 includes the capabilities discussed above with respect to controller 22, and other capabilities enabling it to communicate and control resource database 820, resource tracking module 830, marshalling rules module 840, marshalling heuristic analysis module 850, graphical user interface 860 and incident detection module 870. Upon receipt of an incident trigger, incident controller 810 is configured to establish an incident communications network. Incident controller 810 obtains a marshalling rule from marshalling rules module 840 based on the received information and the determined incident trigger. Incident controller 819 then marshals communications resources based on the marshalling rule accessed from marshalling rules module 840 and the communications resources determined to be available within communications resource database 820. Communications resources are marshaled inviting the identified communications resources to participate in the incident communications network.

Communications resource database 820 is coupled to incident controller 810 and stores communications resources information. Communications resources information includes for each communications resources any combination of a unique resource identifier, a unique combination of identifiers, a resource type, an organization, a jurisdiction, an administrator, a geographic location indicator, a time-proximity indicator, a status and alternative means to communicate with the communications resource or administrator controlling the communications resource.

A unique resource identifier may be any type of descriptor that uniquely identifies a resource. The resource type identifies the type of device, e.g., video camera, cellular phone, smartphone and specifies the communications characteristics of the resource (e.g., screen size, communications protocol, bandwidth, etc.) The organization identifies the type of organization that the resource is associated with, such as, for example, police, fire, private security company and the like. The jurisdiction identifies the jurisdiction associated with the device, such as, for example, District of Columbia, Fairfax county, Montgomery county, etc. The time-proximity indicator indicates the time needed for a communications resource to be located to the area in the proximity of the incident detected. The administrator identifies an individual or device responsible for administrating the communications resource. The status identifies whether the communications resource is available. The alternative means of communicating with a communications resource includes, for example, a telephone number for an administrator that serves as the second contact means, where the first contact means may be an email address or IP address.

Resource tracking module 830 is coupled to communications resource database 820 and tracks the availability of communications resources. Resource tracking module 830 transmits requests to communications resources to confirm availability of communications resources. In an embodiment, the frequency of requests is based on the relative importance of the communications resources. In another embodiment, resource tracking module 820 receives status messages from communications resources that provide an availability of the communications resource. Resource tracking module 830 also is configured to generate alerts when a specified communications resource is unavailable.

Marshalling rules module 840 is coupled to incident controller 810 and stores a set of marshalling rules. A marshalling rule identifies how to select the communications resources to be marshaled into an incident communications network based on an incident trigger. The marshalling rules can consider a variety of factors to determine whether to marshal a communications resource into an incident communications network. For example, a rule within the set of marshalling rules includes the geographical proximity and/or time proximity to the incident in which communications resources should be marshaled. Another rule with the set of marshalling rules includes an importance of a communications resource to be marshaled into the incident communications network. As another example of a rule, a rule specifies whether communications resources should be marshaled into or removed from the incident communications network as incident conditions evolve. Marshalling rules are developed as a function of the type of incident trigger.

For example, if an incident trigger includes a gunshot determined to have originated from college campus, the marshalling rule may include inviting county police, campus police, emergency medical personnel and video cameras on the campus near the location of the gunshot into the incident communications network.

In alternative embodiments, marshalling rules module 840 includes one or more algorithms that dynamically generate the communications resources that should be marshaled into the incident communications network based upon incident conditions, available communications resources, and historical pattern analysis that examine previous incident conditions that are similar to the present conditions to evaluate what resources would be most useful to invite into the incident communications network. The historical pattern analysis looks at activity levels and past performance of communications resources to assist in making decisions on what resources to invite.

In embodiments, two or more administrators may review marshalling rules via a graphical user interface, such as graphical user interface 860. Graphical user interface 860 is configured to display rules and enable real time modification based on inputs from one or more administrator. The rules may be adjust to configures resources for auto-inclusion or request for inclusion, or the right to allow other party's to take control of or share control of a communications resource. Within marshalling rules, the rules identify who will control the communications resources, among the other rules characteristics Incident controller 810 marshals communications resources based on marshalling rules, but also based on the availability of resources as tracked by resource tracking module 830. Incident control 810 marshals communications resources in order of priority and/or availability as specified in marshalling rules, in substitution of an initially specified communications resource or other substitute communications resources when a substitute communications resource is unavailable based on tracking information from resource tracking module 830.

Rules within marshalling rules module 840 also can include a multivariate set of marshalling rules, such that communications resources may be marshaled based upon an identify, geographic proximity or other logical relation of communications resources to other available communications resources marshaled into the incident communications network. For example, a multivariate set of marshalling rules includes, for example, marshalling video resources in proximity to a location of a chemical, biological, radiological or nuclear sensor generating alert.

Marshalling heuristic analysis module 850 is coupled to marshalling rules module 850 and incident controller 810. Marshalling heuristic analysis module 850 monitors incident communications network interactions to heuristically improve marshalling rules. Marshalling heuristic analysis module 850 is configured to enable parties that participated in the incident communications network to rate the value of the communications resources within the incident communications network. Additionally, marshalling heuristic analysis module 850 generates an activity, rating and/or performance metrics for each communications resource involved in the incident communications network. In an embodiment, marshalling heuristic analysis module 850 modifies one or more marshalling rules based on the activity and performance metrics.

Alternatively rules within marshalling rules module 840 can factor in a value rating of a communications resources based on past activities recorded by marshalling heuristic analysis module 850 that are used to determine whether to marshal a communications resources into an incident communications network.

Graphical user interface 860 is coupled to the incident controller. Graphical user interface 860 is configured to display an incident geographical map around the location of an incident that identifies the location and availability of communications resources.

In an embodiment, upon receiving a request for information about a communications resource displayed on the incident geographical map, graphical user interface 860 is configured to display details regarding the communications resources. Additionally, in embodiments an incident geographical map displays communications resources, which are not part of the incident communications network, and organizes the communications resources into groupings based on common characteristics. The common characteristics include, for example, type, organization, location, and/or jurisdiction. In embodiments, incident controller 810 invites or removes communications resources from the incident communications network based on inputs received through graphical user interface 860. That is, a user may select an icon on the display to be removed or added to an incident communications network. In response to such an input received by graphical user interface 860, incident controller 810 takes an appropriate action to add or remove a communications resource.

Incident detection module 870 is coupled to incident controller 810 and is configured to receive and analyze information sources to determine incident triggers. Information sources include traffic reports, transportation reports (e.g., intelligent highway information reports, such as vehicle speed and/or highway closures), police reports, fire reports, missing person reports, security alarms, national weather service alerts, 911 call information, gunshot alerts, video surveillance video streams, video analytics system reports (e.g., advanced video systems to determine suspicious events using, for example, facial recognition), communications resources alert messages, law enforcement and public safety intelligence reports (e.g., intelligence reports generated by fusion centers or homeland security centers), damage assessment reports (e.g., in the event of a hurricane, a government agency may generate reports that can be used to deploy the appropriate resources), medical assessment and capacity reports, equipment availability status, public danger alerts, Internet social media feeds, RFID sensors alerts, geographic location or position reports (e.g., tracking the location of the geographic position of a set of trucks to determine positioning capabilities), hazardous material reports, border or trip sensor reports, environmental monitor reports, mechanical or electromechanical system status reports, human and/or machine based pattern recognition or detection system reports, keyword or concept mined reports derived from other source documents or data, personnel life support systems reports and physiological sensor reports.

Figure 9:
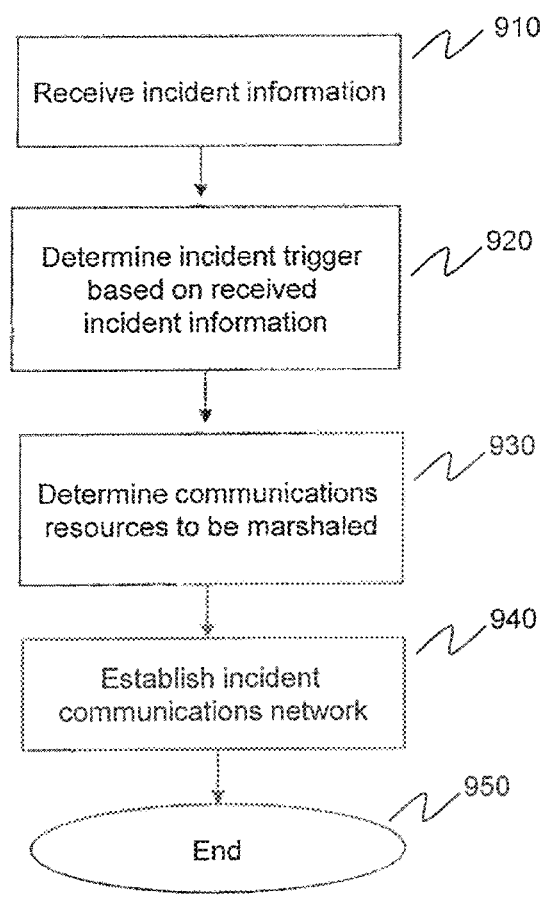
FIG. 9 is a flowchart of a method for establishing an incident communications network, according to an embodiment of the invention.

FIG. 9 provides a method 900 for establishing an incident communications network by determining an incident trigger and marshalling communications resources based on the incident trigger, according to an embodiment of the invention.

Method 900 begins in step 910. In step 910, information from an information source is received. For example, information is received by incident detection module 870. Information sources include, but are not limited to, traffic reports, transportation reports (e.g., intelligent highway information reports, such as vehicle speed and/or highway closures), police reports, fire reports, missing person reports, security alarms, national weather service alerts, 911 call information, gunshot alerts, video surveillance video streams, video analytics system reports (e.g., advanced video systems to determine suspicious events using, for example, facial recognition), communications resources alert messages, law enforcement and public safety intelligence reports (e.g., intelligence reports generated by fusion centers or homeland security centers), damage assessment reports (e.g., in the event of a hurricane, a government agency may generate reports that can be used to deploy the appropriate resources), medical assessment and capacity reports, equipment availability status, public danger alerts, Internet social media feeds, RFID sensors alerts, geographic location or position reports (e.g., tracking the location of the geographic position of a set of trucks to determine positioning capabilities), hazardous material reports, border or trip sensor reports, environmental monitor reports, mechanical or electromechanical system status reports, human and/or machine based pattern recognition or detection system reports, keyword or concept mined reports derived from other source documents or data, personnel life support systems reports and physiological sensor reports.

In step 920 an incident trigger is determined. The information received in step 920 is analyzed to determine whether an incident exists. Information may include information that specifies a type of event (e.g., an alert of a natural disaster or terrorist event) or information that must be analyzed to determine whether an incident exists (e.g., keyword or concepts mined reports derived from source documents that may determine an event or incident is likely to happen).

In step 930 communications resources to be marshaled into the incident communications network based on the incident trigger are determined. The communications resources to be invited to participate in the incident communications network are determined based on the application of one or more marshalling rules that are stored, for example, in marshalling rules module 840. The rule or rules to be applied are based on the determined incident trigger. In an embodiment, communications resources are registered within a communications resources database, such as communications resource database 820.

In step 940, an incident communications network among the communications resources to be marshaled into the incident communications network is established. As discussed above in detail, establishing the incident communications network includes establishing an incident identifier associated with the incident. An electronic message is then transmitted or another means may be used to invite one or more individuals, one or more communications resource, and one or more administrators to be electronically coupled to the incident communications network.

An incident communications network is established among individuals, communications resources and administrators that accept the invitation to be electronically coupled to the incident communications network. Communication rights are granted to communications resources, such that the rights granted for a communications resource are determined by an administrator, individual that controls the communications resource or by communications rights stored in a database. In embodiments, an individual or administrator retains control of communications resources that were under their control prior to the start of the incident.

Each communications resource is invited to join the incident communications network based on the marshalling rule or rules associated with the particular incident trigger. If the primary communications means for inviting a resource is unavailable, then the resource will be notified using an alternative communications means.

Upon determining an incident trigger and establishing an incident communications network, a geographical display of communications resources within a specified geographical area around the incident is displayed. For example, graphical user interface 860 displays a graphical display around the perimeter of the incident that identifies communications resources. The display identifies whether each of the communications resources will be marshaled into the incident communications network and includes a type, organization, status and other information related to each communications resource.

In embodiments, once an incident communications network is established privilege defaults are assigned to communications resource that control access to communications resources within the incident communications network. Additionally, communications resources are monitored to determine communication resources status and location throughout an incident, including receiving status and location information from mobile communications resources.

In other embodiments that include communications resources or administrators having different security level clearances, sessions are created within the incident communications network based upon the classification status of the information source and the security classification of the administrators and communications resources. In such a scenario, the security level of each communications resource and administrator is displayed on a graphical user interface, such as graphical user interface 860. Additionally, communications to administrators or communications resources is controlled based on security level.

In an embodiment, communications resource activity is tracked during an incident. Additionally, communications resources contributions to the incident communications network are rated and one or more rules to determine communications resources that should be marshaled into future incident communications networks may be modified based on the ratings.

In step 950 method 900 ends.

Secure communities, such as the incident communications networks, described above, may be deployed among different types of first responder agencies, different types of homeland security agencies, different types of military units, and even across agencies and military units of different nations, each of which desires to maintain their own highly secure and trusted domains. The need to maintain a high level of security is imposed by highly security sensitive users, and the fundamental articulation of need is expressed is one of a closed network or internetworked enclaves that consist of entities or network members that are implicitly trustworthy. For example, within a particular secure community, resources and users of resources often may belong to the same division or agency, or group of agencies having common security needs.

As stated, the overriding driver for these secure communities is maintaining control over security, such as Certificate Authority (CA) administration, and network and information access and control. Allowing internetworked communications to occur with less trusted community domains represents a risk, especially if internetworked based access is persistently "open," as is often the case.

Notwithstanding the desire for enclaved, secure communities, the missions and operational needs of highly security sensitive communities often requires communications with other entities outside of their communities, often on a temporary and dynamic basis. More generally, for example, consistent with the overall doctrinal mandates within both the joint and coalition military forces context, as well as within the homeland security and defense context, pervasive worldwide interoperability capabilities are critical. The need to maintain security, while also dynamically interconnecting with other secure communities to respond to a particular incident or other temporary circumstance, presents a perplexing challenge.

In an aspect of the present invention, systems and methods are provided that facilitate the establishment of electronic communications connections between two or more secure communities, while ensuring the security of the individual communities. Such secure communities, include, but are not limited to the communities described above, such as interop systems 10 and the incident communications networks established through the marshaling of communications resources, as described with respect to FIGS. 8 and 9.

Figure 10:
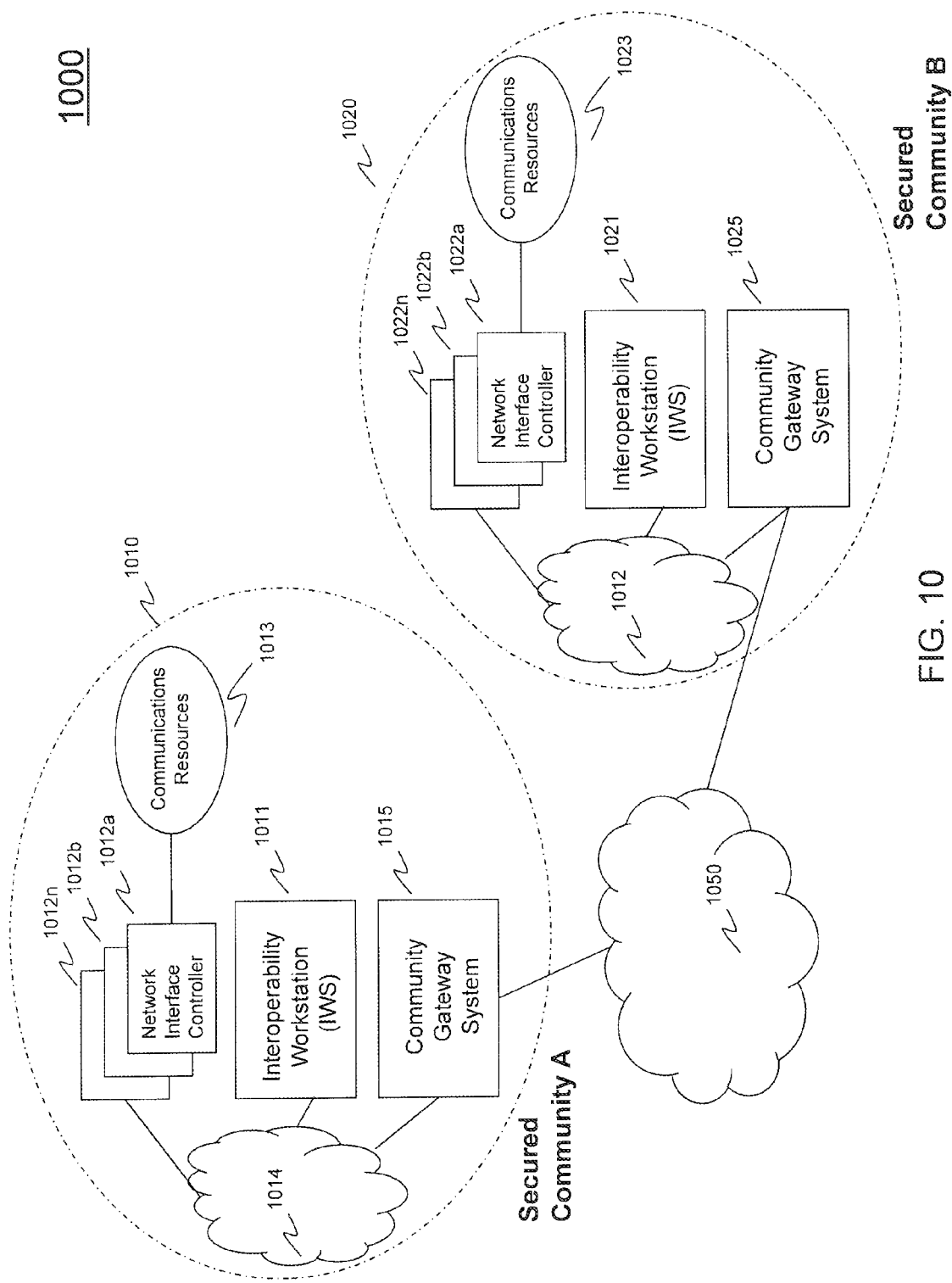
FIG. 10 is a diagram of an electronic communication connection between two secured communities, according to an embodiment of the invention.

FIG. 10 provides a diagram of an electronic communication connection between two secured communities, according to an embodiment of the invention. FIG. 10 illustrates two secure communities, secure community 1010 and 1020. Secure community 1010 includes communications resources 1013, network interface controllers 1012*a-n*, Interoperability Workstation 1011, network 1014 and community gateway system 1015. Similarly, Secure community 1020 includes communications resources 1023, network interface controllers 1022*a-n*, Interoperability Workstation 1021, network 1024 and community gateway system 1025. Secure communities 1010 and 1020 are coupled via an electronic communication connection 1050. As explained with respect to FIGS. 11-13, the electronic communication connection 1050 enables selected end points within communications resources 1013 to communicate with selected end points within communications resources 1023 to communicate. While FIG. 10 illustrates only two interconnected secure communities, the invention is not limited to only the interconnection of two secure communities, but can include interconnections among multiple communities, provided each community has a community gateway system, such as a community gateway system 1015 or 1025. Furthermore, while the communities are shown to be composed of interop systems or incident communication networks, they are not so limited, and may include other types of secured communities.

Figure 11:
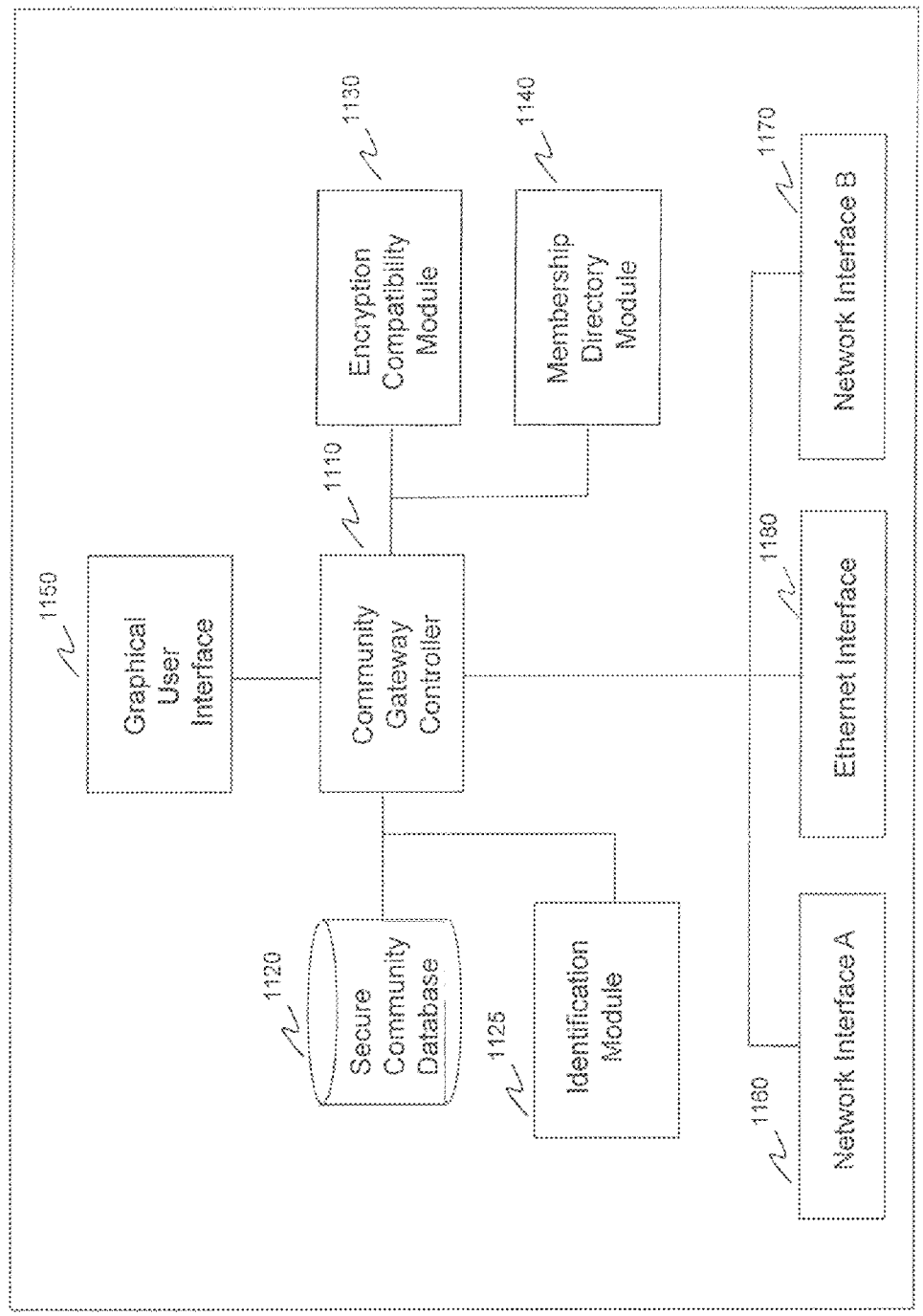
FIG. 11 is a block diagram of a community gateway system, according to an embodiment of the invention.

FIG. 11 provides a block diagram of a community gateway system 1100, according to an embodiment of the invention. Community gateway system 1100 includes community gateway controller 1110, secure community database 1120, identification module 1125, encryption compatibility module 1130, membership directory module 1140, and graphical user interface 1150.

Additionally, community gateway system 1100 includes a variety of network interfaces, including Ethernet interface 1180, network interface A 1160 and network interface B 1170. Network interface A 1160 and network interface B 1170 support either wireless or wireline network interfaces and a variety of networking protocols.

Community gateway system 1100 is a system for establishing an electronic communications connection between two or more secure communities. A secure community includes a collection of communication resources having an administrator that maintains control over the secure community. Examples of secure communities include interop system 10 and the incident communications networks established through the marshaling of communications resources, as described with respect to FIGS. 8 and 9.

The present invention enables these communities to connect to other communities on a discretionary and controlled basis, and allow members within one secure community to communicate with members of another secure community. Member refers to communications resources including devices capable of transmitting and/or receiving voice, video and data communications, database resources, and other devices that may be electronically coupled, such as sensors. Members within a community also may have an association with a user.

In an embodiment, the ability to communicate with other members either within the same community or a different community is on an invitation and acceptance, incident defined basis. Through the use of community gateway system 1100, each secure community administers its own certificate authority (CA) and directory of member endpoints.

Upon receipt of a request to establish a connection between secure communities, community gateway controller 1110 determines whether to grant the request based on information stored in secure community database 1120 and assigns a media transmission encryption scheme for the connection based on a determination made by encryption compatibility module 1130. Once a connection has been established between the host and second secure community, community gateway controller 1110 relays messages between communications resources within the host secure community and the second secure community. Within a secure community, an administrator determines whether to allow communications connections with other secure communities and initiates communications connections with other secure communities.

In embodiments, a secure community may include more than one community gateway controller 1110. In this scenario, the community gateway controllers may have the same or different authorities and functions. Additionally, an administrator may choose to delegate control of a community gateway controller 1110 to one or more other administrators of community gateway controllers. Furthermore, an interoperable workstation within a secure community may remotely control a secure community gateway controller 1110.

Secure community database 1120 is coupled to community gateway controller 1110, and is configured to store secure community information. The secure community information includes secure community identifier information, which includes, but is not limited to secure community identifiers, secure community gateway identifiers, group-based identifiers, functional-based identifiers, individual identifiers for members within a secure community, and geographic identifiers for secure communities and/or members of secure communities. The secure community information also includes secure community encryption information.

The secure community encryption information includes, but is not limited to a media transmission encryption scheme for a secure community, and a relative rank of an encryption scheme for a secure community. The media transmission encryption scheme identifies secure community preferences for the type of media transmission encryption to be used, such that the preferences are used to determine the media transmission encryption to be used between a host and a second secure community upon considering the media transmission encryption preferred by the second secure community. The secure community encryption information of the host secure community includes the encryption preference information of the second secure community. Additionally, the encryption preference information of the second secure community is periodically updated by sending an encryption preference query to the second secure community. Alternatively, the second secure community sends an encryption preference message to the host community periodically. Lastly, the secure community encryption information may include encrypted digital certificates for secure communities and communication resources therein created and exchanged between secure communities and/or includes encrypted digital certificates for secure communities and communications resources therein that were issued from a third party certificate authority.

Additionally, the secure community information may include a pre-authorized connection indicator for a secure community and/or a pre-authorized connection indicator for members of a secure community. The pre-authorized connection indicator identifies whether a communications resource within one secure community is pre-authorized to connect to a communications resource within another secure community.

Identification module 1125 is coupled to community gateway controller 1110 and is configured to accept assignment of, initiate the storing of, and transmit identity information for the host secure community and communication resources therein. Additionally identification module 1125 accepts and validates identity information received from the second secure community and communication resources therein.

Additionally, identification module 1125 has the capability to assign an alias for a communications resource. Upon assigning an alias to a communications resource, identification module 1125 transmits the alias to a secure community. When transmitting the alias, in an embodiment the transmission is via secure transmission. The assignment and transmission of alias may be on a prearranged basis per secure community, a prearranged basis based on the identity of the communications resource or on as needed, ad hoc basis. Upon the establishment of an alias, identification module 1125 sets a timer expiry for which the alias will no longer be usable. Additionally, identification module 1125 logs transmission and events associated with the alias that are linked with a fixed identity of the communications resource of the alias. The log may be stored locally or externally using a relational database or other type of database.

Encryption compatibility module 1130 is coupled to community gateway controller 1110 and is configured to determine a media transmission encryption scheme for a connection between two secure communities. Additionally, encryption compatibility module 1130 determines media transmission encryption schemes for a connection between one or more communications resources within the host secure community and one or more communications resources within the second secure community.

Encryption compatibility module 1130 enables dynamically selected media transmission encryption schemes based upon the identity of the endpoints and the encryption required by the least trusted party. The encryption compatibility module 1130 ranks encryption schemes of the host secure community relative to encryption schemes of other secure communities. Encryption compatibility module 1130 determines and imposes a certain type of and minimum key strength for media encryption (e.g., AES, DES, RSA) among its endpoint members.

Additionally, encryption compatibility module 1130 issues an alert upon determining that members of a secure community require the use of a lower or different level of security than the host secure community. In an embodiment, the alert is a visible security state message available to all members with the host secure community that are participating in a communications session.

Secure community membership directory module 1140 is coupled with community gateway controller 1110 and is configured to determine what member information within the host secure community is made available to other secure communities. In an embodiment, secure community membership directory module 1110 includes a set of policies that govern the membership information that is made available to other secure communities. Display policies may be based upon, for example, one or more of secure community characteristics, characteristics of a communication resource within another secure community, characteristics of a communications resource within the host secure community, third party verification procedures, and/or media transmission encryption schemes. In other embodiments, secure community membership directory 1110 includes a pre-set list that identifies the membership information that is made available to other secure communities.

In embodiments, the secure community membership information that is made visible to other secure communities includes one or more of a community gateway identifier, a member of a secure community identifier, and/or an alias for a member of the secure community identifier.

Each secure community controls what membership information may be viewed from outside the community. For example, a secure community may choose for operation reasons to limit views into their community from outside communities. The secure community may choose only to show certain endpoints that represent various areas, functions, or departments. Furthermore, a secure community may establish different levels of views based on particular communities and also specific endpoints in the other community. For example, a first secure community may choose to allow a second secure community to have a partial view into the endpoints of the first secure community that have a functional need in common with the second secure community (e.g., the functional need could be an "intelligence" need). That same first secure community, may limit access to a third secure community based on a different functional need or interest.

In the case where endpoints are obscured, community gateway controller 1110 may act as an operator and can invite a hidden member of its community into a session involving an external community endpoint. Likewise, community gateway controller 1110 that has invited in a hidden endpoint in its community may choose to remove the endpoint from incident participation. Lastly, various endpoints in a community may have an "alias," as described previously, when dealing with members outside its community.

Graphical user interface 1150 is also coupled to community gateway controller 1110, and used to display various user prompts and system status information. For example, upon receiving an invitation to establish a connection with another secure community, graphical user interface 1150 displays secure community information regarding the other secure community that seeks to establish a connection. Additionally, in an embodiment, graphical user interface 1150 displays a security indication of a relative rank of the media transmission encryption scheme of each secure community that has been connected and/or displays a security indication of a relative rank of the media transmission encryption scheme of each member within secure communities that have been connected. Furthermore, for any incident where there exists endpoints that have a media transmission encryption scheme that is not the same or equal to the media transmission encryption scheme for the community, graphical user interface 1150 provides a visual symbol of lower or different security for the endpoints. Additionally, to differentiate and assist users, out of community endpoints are visually distinguished and their level of security identified.

Figure 12:
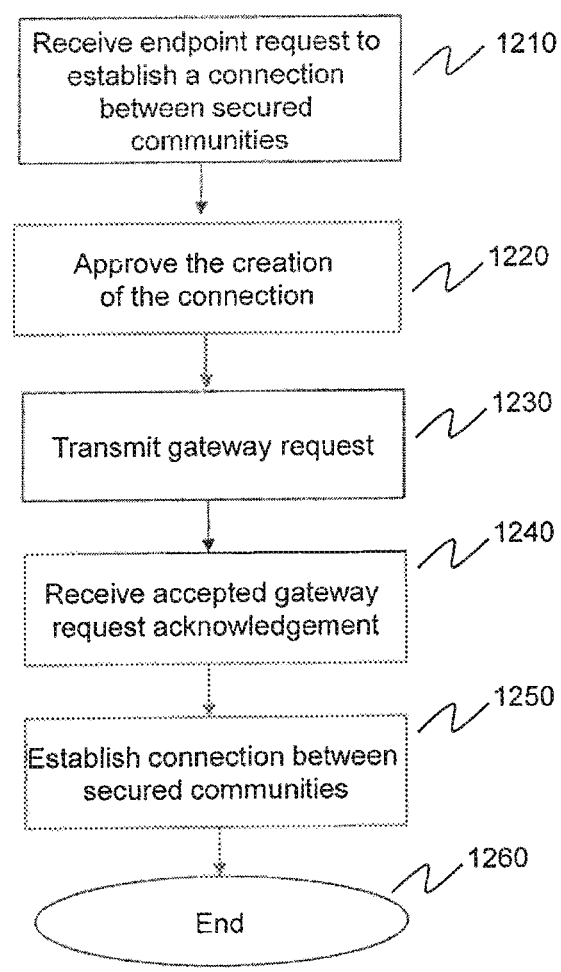
FIG. 12 is a flowchart of a method for establishing an electronic communications connection between two secure communities from the perspective of an originating secure community, according to an embodiment of the invention.

FIG. 12 is a flowchart of a method 1200 for establishing an electronic communications connection between two secure communities from the perspective of an originating secure community, according to an embodiment of the invention.

Method 1200 begins in step 1210. In step 1210, an endpoint request from a communication resource within a host secure community to establish the electronic communications connection to a second secure community is received by a community gateway control system, such as community gateway system 1100.

In step 1220, the creation of the electronic communications connection is approved. In an embodiment, approving the creation of the electronic communications connection includes confirming whether a pre-connection authorization to the second secure community exists within the host community gateway system.

In step 1230, a gateway request to the second secure community to establish the electronic communications connection is transmitted.

In step 1240, an accepted gateway request from the second secure community is received by the community gateway system, such as community gateway system 1100.

In step 1250, an electronic communication connection between the host secure community and the second secure community is established. In an embodiment, a media transmission encryption scheme for the electronic communications connection based on the identity of the endpoint and encryption required by a least trusted party is also negotiated and established.

In step 1260, method 1200 ends. In establishing an electronic communications connection between a host secure community and a second secure community additional identification and encryption information may optionally be sent. For example, a host secure community transmits host community identifying information and/or available media transmission encryption schemes and preferences of the host secure community to the second secure community. Additionally, the host secure community may transmit a query to the second secure community seeking available encryption schemes and preferences of the second secure community.

In return, the host secure community may receive from the second secure community available encryption schemes and preferences of the second secure community. The host and second secure community then negotiate a media transmission encryption scheme that is agreeable to the host secure community and the second secure community.

In an embodiment, as part of the process of establishing a communication connection between secure communities, a community gateway controller approves that an electronic communications connection can be established. As part of the approval process, a community gateway controller approves the creation of the electronic communications connection by authenticating the identity of the second secured community. Alternatively or in addition, a community gateway controller approves the creation of the electronic communications connection by obtaining approval from one or more other entities designated with an authority to approve a connection request based on other information, including state of emergency, state of need, or operational necessity. In this scenario, the means of approval may be by, for example, one or more of email, instant message, a structured or unstructured data message, and/or an audio or video message delivered to the approving party.

Once the communications connection is established between secure communities to transmit messages, a community gateway controller receives from a requesting communications resource within the host secure community communications and media content. These communications and content are then retransmitted or routed to the second secured community via the established communications connection between the host secure community and second secure community.

Similarly, to receive messages by a host secure community from a second secure community, a host community gateway controller receives from the second secure community via the established communications connection communications and media content originated by or through an interoperable workstation and connected communications resources within the second secure community. These communications and content are then retransmitted or routed to an interoperable workstation and associated communications resources within the host secure community.

Figure 13:
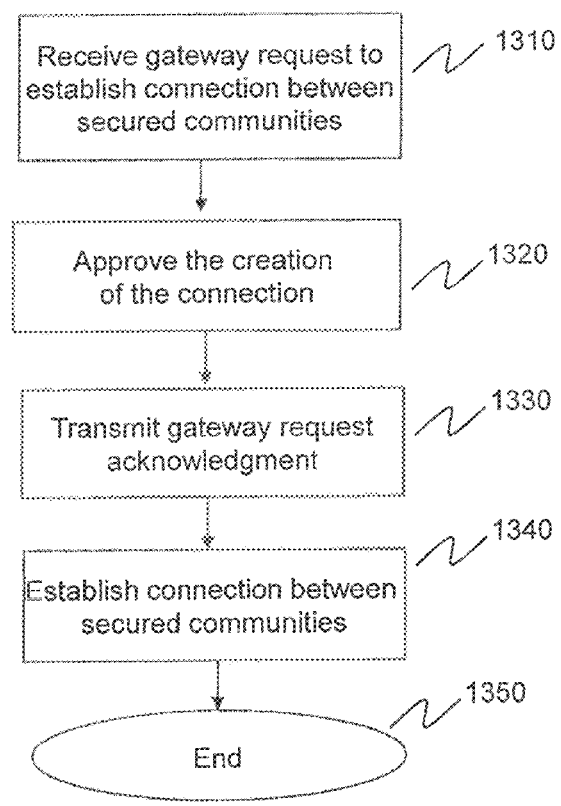
FIG. 13 is a flowchart of a method for establishing an electronic communications connection between two secure communities from the perspective of a receiving secure community, according to an embodiment of the invention.

FIG. 13 is a flowchart of a method 1300 for establishing an electronic communications connection between two secure communities from the perspective of a receiving secure community, according to an embodiment of the invention.

Method 1300 begins in step 1310.

In step 1310, a gateway request from a secure community to establish the electronic communications connection to a second secure community is received by a community gateway control system, such as community gateway system 100.

In step 1320, the creation of the electronic communications connection is approved. In an embodiment, approving the creation of the electronic communications connection includes confirming whether a pre-connection authorization to the secure community that transmitted the gateway request exists within the receiving community gateway system.

In step 1330, a gateway request acknowledgment to the secure community that transmitted the gateway request to establish the electronic communications connection is transmitted.

In step 1340, an electronic communication connection between the secure community that transmitted the gateway request and the secure community that received the gateway request is established. In an embodiment, a media transmission encryption scheme for the electronic communications connection based on the identity of the endpoint and media transmission encryption scheme required by a least trusted party is also established.

In step 1350, method 1300 ends.

Computer System Implementation

Figure 14:
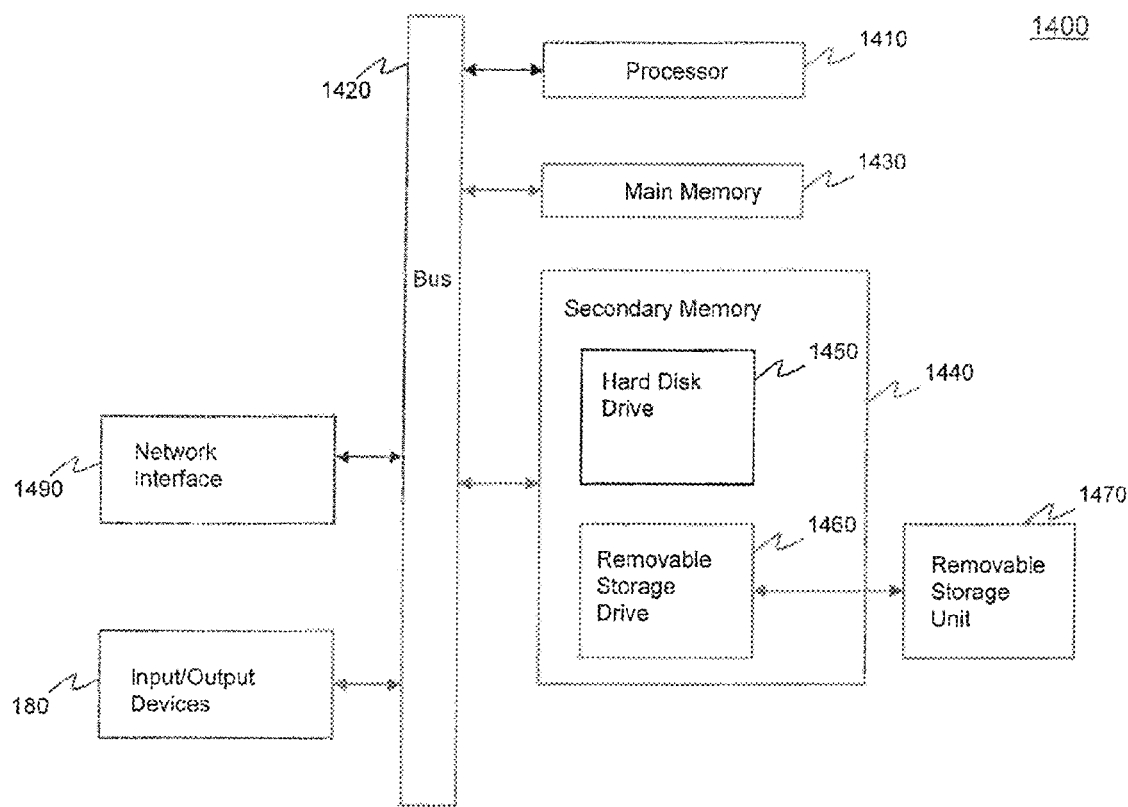
FIG. 14 is an example computer system useable to implement embodiments of the present invention.

Various aspects of the invention can be implemented by software, firmware, hardware, or a combination thereof. FIG. 14 illustrates an example computer system 1400 in which the present invention, or portions thereof, can be implemented as computer-readable code. After reading this description, it will become apparent to a person skilled in the relevant art how to implement the invention using other computer systems and/or computer architectures.

Computer 1400 includes one or more processors (also called central processing units, or CPUs), such as processor 1410. Processor 1410 is connected to communication bus 1420. Computer 1400 also includes a main or primary memory 1430, preferably random access memory (RAM). Primary memory 1430 has stored therein control logic (computer software), and data.

Computer 1400 may also include one or more secondary storage devices 1440. Secondary storage devices 1440 include, for example, hard disk drive 1450 and/or removable storage device or drive 1460. Removable storage drive 1460 represents a floppy disk drive, a magnetic tape drive, a compact disk drive, an optical storage device, tape backup, ZIP drive, JAZZ drive, etc.

Removable storage drive 1460 interacts with removable storage unit 1470. As will be appreciated, removable storage unit 1460 includes a computer usable or readable storage medium having stored therein computer software (control logic) and/or data. Removable storage drive 1460 reads from and/or writes to the removable storage unit 1470 in a well known manner.

Removable storage unit 1470, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 1400, or multiple computer 1400s to perform any combination of the functions described herein.

Computer programs (also called computer control logic) are stored in main memory 1430 and/or the secondary storage devices 1440. Such computer programs, when executed, direct computer 1400 to perform the functions of the present invention as discussed herein. In particular, the computer programs, when executed, enable processor 1410 to perform the functions of the present invention. Accordingly, such computer programs represent controllers of the computer 1400.

Computer 1400 also includes input/output/display devices 1480, such as monitors, keyboards, pointing devices, etc.

Computer 1400 further includes a communication or network interface 1490. Network interface 1490 enables computer 1400 to communicate with remote devices. For example, network interface 1490 allows computer 1400 to communicate over communication networks, such as LANs, WANs, the Internet, etc. Network interface 1490 may interface with remote sites or networks via wired or wireless connections. Computer 1400 receives data and/or computer programs via network interface 1490.

CONCLUSION

The invention can work with software, hardware, and operating system implementations other than those described herein. Any software, hardware, and operating system implementations suitable for performing the functions described herein can be used.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A system for establishing an electronic communications connection between two or more secure communities, wherein a secure community includes a collection of communications resources having an administrator that maintains control over the secure community and the collection, comprising:

a community gateway controller comprising one or more processors;

a memory coupled to the community gateway controller, for storing instructions;

a secure community database coupled to the community gateway controller configured to store secure community information;

an encryption compatibility module in the memory, comprising instructions for directing the community gateway controller to determine a first media transmission encryption scheme for a connection between a host secure community and a second secure community of the two or more secure communities, and to determine a second media transmission encryption scheme for a connection between one or more communications resources within the host secure community and one or more communications resources within the second secure community; and an identification module in the memory, comprising instructions for directing the community gateway controller to accept assignment of, initiate the storing of, and transmit identity information for the host secure community and the one or more communications resources therein, and to accept and validate identity information received from the second secure community and the one or more communications resources therein, wherein the community gateway controller, upon receipt of a request to establish a communications connection between the host and second secure communities determines whether to grant the request based on information stored in the secure community database and in the encryption compatibility module, wherein upon establishing the communications connection between the host and second secure communities, the community gateway controller relays messages between the one or more communications resources within the host secure community and the one or more communications resources within the second secure community.

2. The system of claim 1, wherein the secure community information includes secure community identifier information.

3. The system of claim 2, wherein the secure community identifier information includes one or more of: a secure community identifier, a community gateway identifier, individual identifiers for members within a secure community, or a geographic identifier for a secure community and/or members of the secure community.

4. The system of claim 1, wherein the secure community information includes secure community encryption information.

5. The system of claim 4, wherein the secure community encryption information includes encrypted digital certificates for secure communities and communications resources therein created and exchanged between secure communities, and/or encrypted digital certificates for secure communities and communications resources therein that were issued from a third party certificate authority.

6. The system of claim 4, wherein the secure community encryption information includes a media transmission encryption scheme of the host secure community that identifies host secure community preferences for a type of media transmission encryption to be used, wherein the preferences are used to determine the first media transmission encryption to be used between the host and the second secure communities upon considering a media transmission encryption preferred by the second secure community.

7. The system of claim 4, wherein the secure community encryption information of the host secure community includes encryption preference information of the second secure community, wherein the encryption preference information of the second secure community is periodically updated based on an encryption preference from the second secure community.

8. The system of claim 1, wherein the secure community information includes at least one of: a pre-authorized connection indicator for a secure community or a pre-authorized connection indicator for members of a secure community.

9. The system of claim 1, wherein the encryption compatibility module further comprises instructions for directing the community gateway controller to rank encryption schemes of the host secure community relative to encryption schemes of other secure communities of the two or more secure communities.

10. The system of claim 1, wherein the encryption compatibility module further comprises instructions for directing the community gateway controller to issue an alert upon determining that the one or more communications resources of the second secure community require the use of a different level of security than the host secure community or the one or more communications resources therein.

11. The system of claim 10, wherein the alert is a visible security state message available to all members with the host secure community participating in a communications session.

12. The system of claim 1, further comprising a secure community membership directory module in the memory, comprising instructions for directing the community gateway controller to determine what communications resource information within the host secure community is made available to other secure communities of the two or more secure communities.

13. The system of claim 12, wherein the secure community membership directory module includes a set of policies that govern secure community information that is made available to the other secure communities.

14. The system of claim 12, wherein the secure community membership directory includes a pre-set list that identifies secure community information that is made available to the other secure communities.

15. The system of claim 12, wherein the secure community membership directory includes display indicators that identify the secure community information that is made available to the other secure communities based on identities of the other secure communities.

16. The system of claim 12, wherein the secure community membership directory includes policies that determine what secure community information is made available to the other secure communities and communications resources within the other secure communities, wherein the policies are based upon one or more of: a characteristic of a secure community of the two or more secure communities, a characteristic of a communications resource within a secure community of the two or more secure communities, a characteristic of a communications resource within the host secure community, a third party verification procedure, or a media transmission encryption scheme.

17. The system of claim 16, wherein the secure community information made available includes one or more of: a community gateway controller identifier, an identifier of a communications resource of a secure community, a group-based identifier, a functional-based identifier, or an alias for a communications resource of a secure community.

18. The system of claim 1, wherein upon receiving an invitation to establish the communications connection with the second secure community or a communications resource therein, g graphical user interface coupled to the community gateway controller is configured to display secure community information regarding the second secure community or the communications resource therein.

19. The system of claim 1, wherein a graphical user interface coupled to the community gateway controller is configured to display a security indication of a relative rank of a media transmission encryption scheme of a secure community of the two or more secure communities that is to be or has been connected.

20. The system of claim 1, wherein the secure community further comprises:
an interoperability workstation; and
a plurality of network interface controllers, wherein a network interface controller within the plurality of network interface controllers is coupled to a communications resource within the collection of communications resources enabling the communications resource to be communicatively coupled to the interoperability workstation, wherein the interoperability workstation administers access to and from the communications resource within the secure community.

21. The system of claim 1, wherein the administrator determines whether to allow communications connections with other secure communities of the two or more secure communities, and initiates the communications connections with the other secure communities.

22. The system of claim 1, wherein the host secure community includes more than one community gateway controller.

23. The system of claim 22, wherein the more than one community gateway controllers have the same authority and functions.

24. The system of claim 22, wherein the more than one community gateway controllers have different authorities and functions.

25. The system of claim 22, wherein an administrator of the host secure community delegates control of the community gateway controller to one or more other administrators of community gateway controllers.

26. The system of claim 1, wherein one or more interoperable workstations are coupled to the community gateway controller.

27. The system of claim 1, wherein an interoperable workstation within the host secure community may remotely control the community gateway controller.

28. The system of claim 1, wherein the identification module further comprises instructions for directing the community gateway controller to assign an alias for a communications resource.

29. The system of claim 28, wherein the identification module further comprises instructions for directing the community gateway controller to transmit the alias to the second secure community by prearrangement.

30. The system of claim 28, wherein the identification module further comprises instructions for directing the community gateway controller to transmit the alias to the second secure community via a secure transmission.

31. The system of claim 28, wherein the identification module further comprises instructions for directing the community gateway controller to establish an expiry time for the alias upon which the alias is no longer usable.

32. The system of claim 28, wherein the identification module further comprises instructions for directing the community gateway controller to log transmission and events associated with the alias that are associated with a fixed identity of the communications resource of the alias.

33. The system of claim 1, wherein the communications resources include radios, smart phones, and other devices.

34. The system of claim 1, wherein the communications resources include sensors, video cameras, and other devices.

35. The system of claim 1, wherein the first media transmission encryption scheme and the second media transmission encryption scheme are the same.

36. The system of claim 1, wherein the first media transmission encryption scheme and the second media transmission encryption scheme are different.

37. The system of claim 1, wherein a graphical user interface coupled to the community gateway controller is configured to display a security indication of a relative rank of a media transmission encryption scheme of a communications resource within a secure community of the two or more secure communities that is to be, or has been connected.

* * * * *

UNITED STATES PATENT AND TRADEMARK OFFICE
CERTIFICATE OF CORRECTION

PATENT NO. : 9,871,767 B2
APPLICATION NO. : 13/800727
DATED : January 16, 2018
INVENTOR(S) : Joseph R. Mazzarella It is certified that error appears in the above-identified patent and that said Letters Patent is hereby corrected as shown below:

In the Claims

Claim 18, Column 26, Line 32, "therein, g graphical user interface" should read --therein, a graphical user interface--.

Signed and Sealed this
Fourth Day of June, 2019

Andrei Iancu
*Director of the United States Patent and Trademark Office*